United States Patent
Liu et al.

(10) Patent No.: US 12,342,351 B2
(45) Date of Patent: Jun. 24, 2025

(54) SYSTEMS AND METHODS FOR DOWNLINK CONTROL INFORMATION TRANSMISSION

(71) Applicant: ZTE CORPORATION, Guangdong (CN)

(72) Inventors: Xing Liu, Shenzhen (CN); Kai Xiao, Shenzhen (CN); Junfeng Zhang, Shenzhen (CN); Chenchen Zhang, Shenzhen (CN); Xianghui Han, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 449 days.

(21) Appl. No.: 17/873,984

(22) Filed: Jul. 26, 2022

(65) Prior Publication Data

US 2022/0361235 A1 Nov. 10, 2022

Related U.S. Application Data

(63) Continuation of application No. PCT/CN2020/090533, filed on May 15, 2020.

(51) Int. Cl.
*H04W 72/23* (2023.01)
*H04W 72/1263* (2023.01)

(52) U.S. Cl.
CPC ....... *H04W 72/23* (2023.01); *H04W 72/1263* (2013.01)

(58) Field of Classification Search
None
See application file for complete search history.

(56) References Cited

U.S. PATENT DOCUMENTS

| | | | | |
|---|---|---|---|---|
| 11,224,020 | B2 * | 1/2022 | Choi | H04W 72/044 |
| 2020/0359447 | A1 * | 11/2020 | Yang | H04W 72/1268 |
| 2021/0022134 | A1 * | 1/2021 | Chen | H04L 5/0078 |
| 2021/0068195 | A1 * | 3/2021 | Yang | H04W 72/1268 |
| 2021/0144708 | A1 * | 5/2021 | Wang | H04W 72/0453 |
| 2021/0168783 | A1 * | 6/2021 | Islam | H04L 5/0053 |
| 2021/0168848 | A1 * | 6/2021 | Chatterjee | H04W 72/569 |

(Continued)

FOREIGN PATENT DOCUMENTS

| | | |
|---|---|---|
| CN | 110366245 A | 10/2019 |
| CN | 110366246 A | 10/2019 |

(Continued)

OTHER PUBLICATIONS

International Search Report and Written Opinion for PCT Appl. No. PCT/CN2020/090533, mailed Feb. 18, 2021 (8 pages).

(Continued)

*Primary Examiner* — Hassan A Phillips
*Assistant Examiner* — Gautam Sharma
(74) *Attorney, Agent, or Firm* — Foley & Lardner LLP

(57) ABSTRACT

Systems and methods for wireless communications are disclosed herein. In one embodiment, a wireless communication device determines that a first resource indicated by uplink cancelation information overlaps with a second resource. The wireless communication device receives, from a network, an uplink (UL) grant scheduling a third resource. An ending symbol of a first downlink control channel carrying the UL grant is no earlier than a first symbol of a second downlink control channel carrying the uplink cancelation information.

20 Claims, 14 Drawing Sheets

(56) References Cited

U.S. PATENT DOCUMENTS

2021/0321482 A1* 10/2021 Oteri ................ H04W 72/0446
2022/0353887 A1* 11/2022 Xu ........................ H04W 72/21

FOREIGN PATENT DOCUMENTS

| CN | 110612692 A | 12/2019 |
| CN | 110972303 A | 4/2020 |
| WO | WO-2019/082157 A1 | 5/2019 |
| WO | WO-2019/191977 A1 | 10/2019 |
| WO | WO-2020/033660 A1 | 2/2020 |

OTHER PUBLICATIONS

SONY: "Remaining issues in inter-UE multiplexing" 3GPP TSG RAN WG1 #100bis; R1-2001817; Apr. 30, 2020; e-Meeting (8 pages).

First Office Action for CN App. No. 202080095754.3 dated Jun. 20, 2024 (with English translation, 13 pages).

ZTE, "Remaining issues on UL inter-UE multiplexing between eMBB and URLLC," 3GPP TSG RAN WG1 #100bis; R1-2001615; Apr. 20-24, 2020; e-Meeting (11 pages).

\* cited by examiner

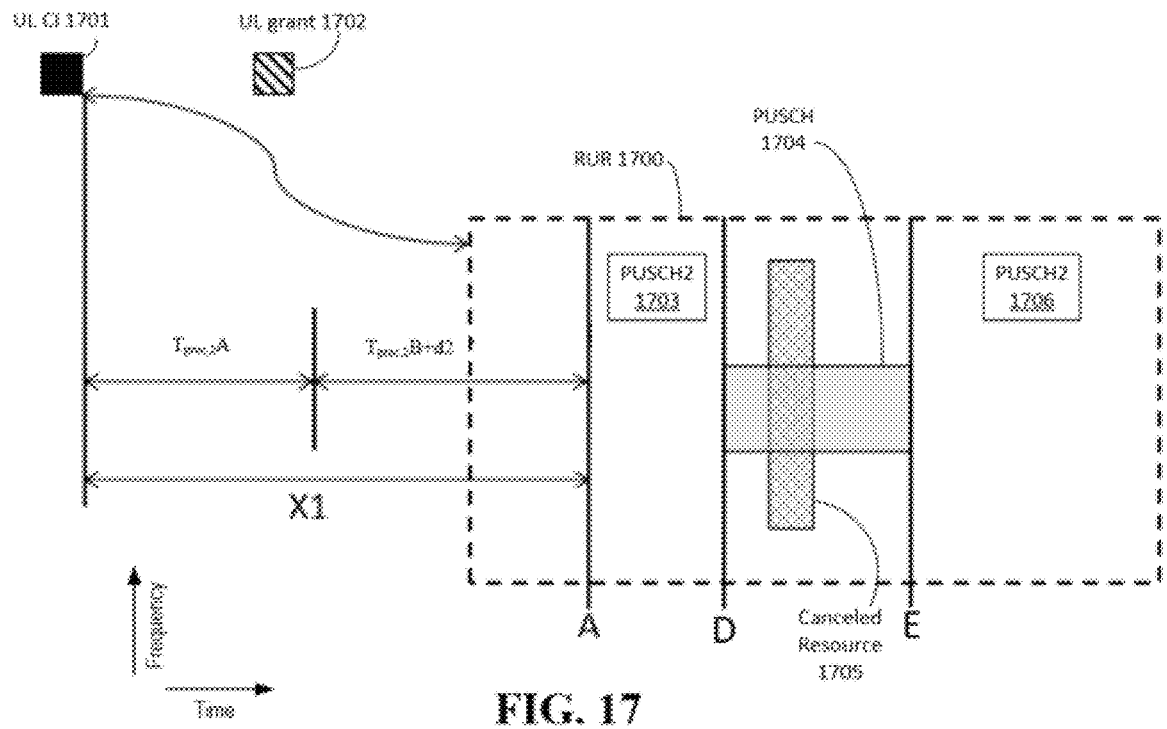
FIG. 17
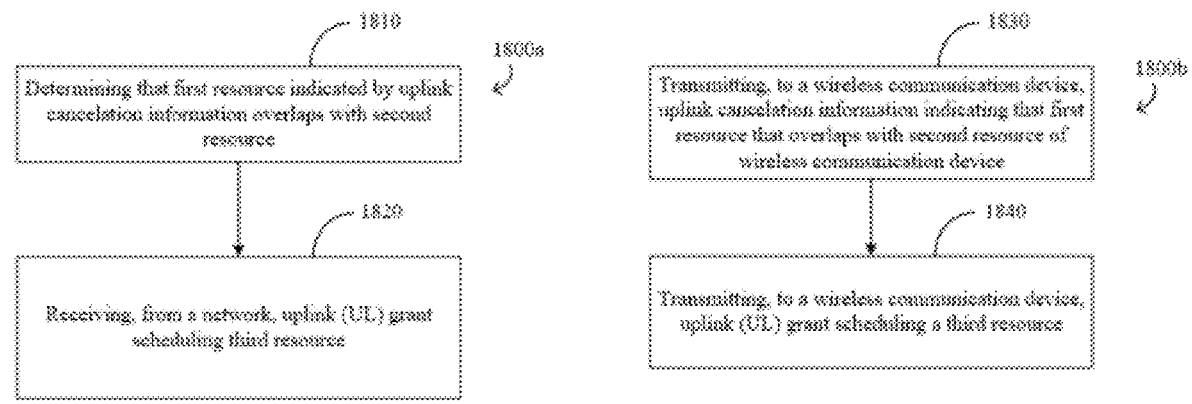
FIG. 18A
FIG. 18B

SYSTEMS AND METHODS FOR DOWNLINK CONTROL INFORMATION TRANSMISSION

CROSS-REFERENCE TO RELATED APPLICATION

This application claims the benefit of priority under 35 U.S.C. § 120 as a continuation of PCT Patent Application No. PCT/CN2020/090533, filed on May 15, 2020, the disclosure of which is incorporated herein by reference in its entirety.

TECHNICAL FIELD

The present disclosure relates to the field of telecommunications, and in particular, to detecting information indicative of preemption of transmission resources.

BACKGROUND

Demands for the 5th Generation Mobile Communication Technology (5G) are increasing at a rapid pace. Developments are taking place to provide enhanced mobile broadband, ultra-high reliability, ultra-low-latency transmission, and massive connectivity in 5G systems.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication device determines that a first resource indicated by uplink cancelation information overlaps with a second resource. The wireless communication device receives, from a network, an uplink (UL) grant scheduling a third resource. An ending symbol of a first downlink control channel carrying the UL grant is no earlier than a first symbol of a second downlink control channel carrying the uplink cancelation information.

In some embodiments, a network transmits, to a wireless communication device, uplink cancelation information indicating a first resource. The first resource overlaps with a second resource of the wireless communication device. The network transmits, to the wireless communication device, a UL grant scheduling a third resource. An ending symbol of a first downlink control channel carrying the UL grant is no earlier than a first symbol of a second downlink control channel carrying the uplink cancelation information.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 17 is a schematic diagram illustrating an example RUR, in accordance with a eleventh method;

FIG. 18A is a schematic diagram illustrating a method for downlink control information transmission, in accordance with some embodiments of the present disclosure.

FIG. 18B is a schematic diagram illustrating a method for downlink control information transmission, in accordance with some embodiments of the present disclosure.

DETAILED DESCRIPTION OF EXAMPLE EMBODIMENTS

Figure 1:
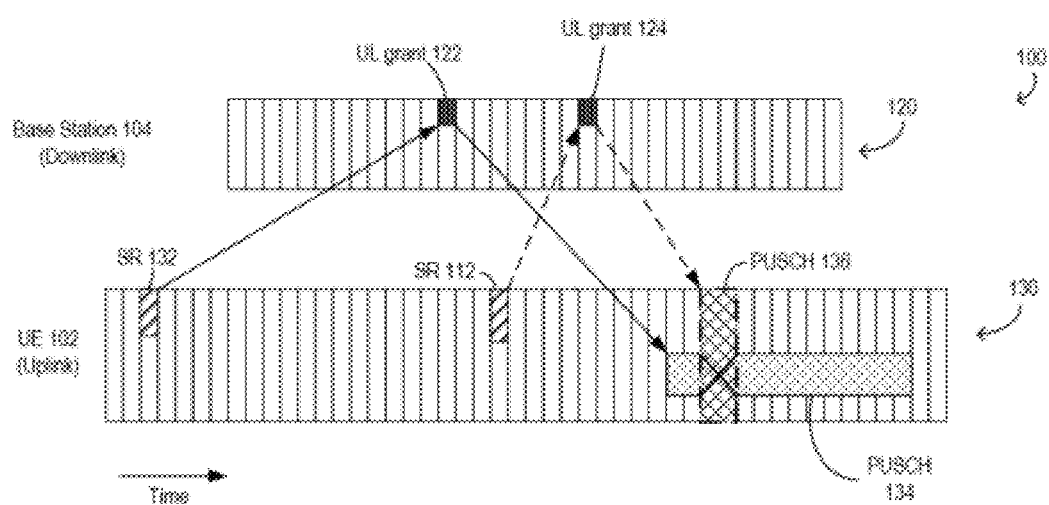
FIG. 1 is a schematic diagram illustrating physical uplink shared channel (PUSCH) resource being preempted, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Developments in 5G wireless communication systems are directed to achieving higher data communicate rate (e.g., in Gbps), massive number of communication links (e.g., 1 M/Km$^2$), ultra-low latency (e.g., under 1 ms), higher reliability, and improved energy efficiency (e.g., at least 100 times more efficient than previous systems). To achieve such improvements, in wireless communication systems under the 5G standard, different types of services are configured with different priority levels according to different needs for and tolerance to latency, reliability, energy efficiency, and so on. For example, different types of uplink services with different transmission delay reliability requirements and different priority channels for the same service can be transmitted.

When different services having different priority levels are transmitted within a same cell, to provide transmission capabilities of high-priority services, transmission resources for low-priority services may be preempted by high-priority services, and the transmission of the low-priority services using those preempted transmission resources are canceled. Such mechanism avoids collisions between the low-priority services and the high-priority services in transmitting using the same transmission resources. In some cases, a first service with one or more of a higher priority level, higher reliability, or shorter transmission time can preempt transmission resources for a second service with one or more of a lower priority level, lower reliability, or longer transmission time.

To minimize the performance impact, preemption indication information needs to be conveyed to the UE that has its transmission resources preempted. The preempted transmission resources can be referred to as "canceled transmission resources." The preemption indication information can be referred to as "cancelation indication information."

With respect to uplink transmission resource preemption (e.g., uplink service cancelation), an indication such as but not limited to, uplink cancelation indication (UL CI, which can also be called as DCI format2_4 carried in a PDCCH), can be defined for uplink time-frequency domain resources. In order to prevent uplink transmission of the UE, the UE needs to be notified of a preemption via a UL CI before transmission of the uplink service. Based on such uplink cancelation indication, uplink transmissions of services that have a relatively low priority level can accordingly be canceled (if not yet transmitted) or stopped (while being transmitted), thus avoiding performance degradation resulting from simultaneously transmitting both types of services using the same uplink transmission resource. The embodiments described herein relate to the manner in which the network side indicates or signals uplink transmission resource preemption or uplink service cancelation.

FIG. 1 is a schematic diagram illustrating a process 100 by which a PUSCH uplink transmission resource is preempted, in accordance with some embodiments of the present disclosure. Referring to FIG. 1, the process 100 involves a UE 102 and a base station 104 (e.g., a BS, gNB, eNB, and so on). An uplink transmission diagram 130 illustrates uplink activities for the UE 102. A downlink transmission diagram 120 illustrates downlink activities of the base station 104. The diagrams 120 and 130 show slots divided in the time domain (denoted by the horizontal axis). In some examples, the dimension or axis of each of the diagrams 120 and 130 that is perpendicular to the time domain axis represents frequency such as but not limited to, a bandwidth, an active uplink bandwidth part (BWP), and so on. Frequency is discontinuous across the different diagrams 120 and 130.

The UE 102 sends a scheduling request (SR) 132 to the base station 104 in uplink. The SR 132 requests the base station 104 for uplink transmission resource for uplink service referred to as a first uplink service. Examples of the first uplink service include but are not limited to, an enhanced mobile broadband (eMBB) service. The base station 104 allocates a first uplink transmission resource (e.g., a PUSCH 134) for the UE 102 via uplink grant (UL grant) 122. The base station 104 sends the UL grant 122 to the UE 102 in downlink to notify the UE 102 that the UE 102 can transmit the first uplink service using the PUSCH 134.

After the UE 102 sends the SR 132 to the base station 104, and after the base station 104 sends the UL grant 122 to the UE 102, the UE 102 sends an SR 112 to the base station 104. The SR 112 requests the base station 104 for uplink transmission resource for uplink service referred to as a second uplink service. Examples of the second uplink service include but are not limited to, an ultra-reliable low latency communications (URLLC) service.

Given that the second uplink service (e.g., the URLLC service) of the UE 106 has ultra-high reliability and ultra-low-latency transmission requirements, the base station 104 allocates uplink transmission resource that is as early in time as possible. The base station 104 determines that a second uplink transmission resource (e.g., a PUSCH 136) that satisfies the ultra-high reliability and ultra-low-latency transmission requirements may have already been allocated to the UE 102. That is, the base station 104 determines that at least a portion of the PUSCH 134 collides (e.g., overlaps) with at least a portion of the PUSCH 136. In response to determining that the priority level of the second uplink service (e.g., the URLLC service) of the UE 106 is higher than the priority level of the first uplink service (e.g., the eMBB service) of the UE 102, the base station 104 cancels the transmission of the first uplink service on the previously allocated uplink transmission resource (e.g., the PUSCH 134). The UE 102 can cancel or continue transmission of the first uplink service in a remainder of the PUSCH 134 (e.g., the portion of the PUSCH 134 that is after the PUSCH 136).

The low-priority uplink transmission can be canceled using various methods. In one example, the base station 104 reschedules a new uplink transmission resource (not shown) for the UE 102 and then cancels the uplink transmission on the originally allocated uplink transmission resource (e.g., the PUSCH 134). The base station 104 can retransmit the uplink grant (retransmission not shown) to the UE 102 to notify the UE 102 that the UE 102 can transmit the first uplink service using the new PUSCH (e.g., the transmission is rescheduled to another uplink transmission resource PUSCH). A new data indicator (NDI) field of the new uplink grant is toggled, thus indicating that the new uplink grant corresponds to the first uplink service (e.g., the eMBB service). In some examples, the entire originally allocated uplink transmission resource (e.g., the PUSCH 134) or a portion thereof can be rescheduled and released using such method. Also, an entire transport block (TB) or a portion thereof can be transmitted using the new uplink transmission resource.

In another example, the base station 104 can notify the UE 102 that the originally allocated uplink transmission resource (e.g., the PUSCH 134) is preempted by the high-priority service transmission using cancelation indication signaling (e.g., the UL CI). Accordingly, the UE 102 cancels the transmission on the preempted resource (e.g., the PUSCH 134) in response to receiving the cancelation indication signaling. The cancelation indication signaling can be carried in the physical DCI on the downlink control channel or another specific signal sequence.

In yet another example, the base station 104 can instruct the UE 102 to reduce transmission power to zero on the entire originally allocated uplink transmission resources (e.g., the PUSCH 134) or a portion thereof, to indirectly cancel the transmission of the first uplink service on the entire originally allocated uplink transmission resource (e.g., the PUSCH 134) or a portion thereof, respectively. Accordingly, in response to receiving transmission power reduction commands/signals from the base station 104, the UE 102 cancels transmission on the entire originally allocated uplink transmission resource (e.g., the PUSCH 134) or a portion thereof.

The cancelation of the first uplink service caused by the collision with the high-priority second uplink service described with reference to the process 100 is an illustrative example of a scenario applicable to the present embodiments, and additional scenarios in which an uplink service is canceled can be caused by other suitable reasons and are likewise applicable to the present embodiments. Examples of such additional scenarios include but are not limited to, an uplink service being canceled due to conflicts with frame structure configuration, an uplink service being canceled due to collisions with other uplink transmissions of the same UE or different UEs, an uplink service being canceled due to power limitations of the 102, and so on.

In some embodiments, the PUSCH (e.g., the PUSCH 134) is an example of uplink transmission resources capable of carrying data for both low-priority services and high-priority services. A scheme similar to the scheme for canceling the first uplink transmission on the PUSCH 134 can be implemented for canceling one or more other types of uplink transmissions with lower priority such as but not limited to, those uplink transmissions on a physical uplink control channel (PUCCH), sounding reference signal (SRS), physical random access channel (PRACH), and so on, due to preemption in favor of one or more other types of uplink transmissions with higher priority. While the second uplink service transmitted using the PUSCH 136 is illustrated as an example of high-priority uplink services that can cause the cancelation of low-priority uplink services, transmissions of other types of high-priority uplink services (e.g., uplink transmissions communicated on the PUCCH, SRS, PRACH, and so on) can likewise cause the cancelation of low-priority uplink services.

Figure 2:
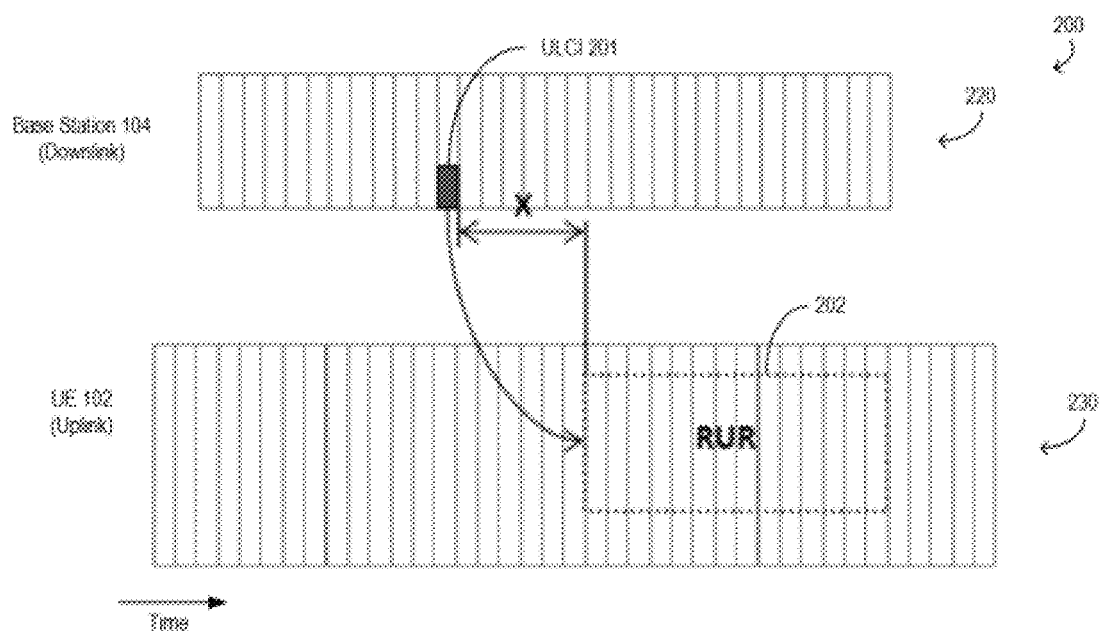
FIG. 2 is a schematic diagram illustrating a process for canceling uplink transmissions, in accordance with some embodiments of the present disclosure.

FIG. 2 is a schematic diagram illustrating a process 200 for canceling uplink transmissions, in accordance with some embodiments of the present disclosure. Referring to FIGS. 1 and 2, the process 200 involves the UE 102 and the base station 104. An uplink transmission diagram 230 illustrates uplink activities for the UE 102. A downlink transmission diagram 220 illustrates downlink activities of the base station 104. The diagrams 220 and 230 show slots divided in the time domain (denoted by the horizontal axis). In some examples, the dimension or axis of each of the diagrams 220 and 230 that is perpendicular to the time domain axis represents frequency such as but not limited to, a bandwidth, an active uplink BWP, a carrier, and so on. Frequency is discontinuous across the different diagrams 220 and 230.

In some embodiments, the base station 104 can send an UL CI 201 in the downlink to the UE 102. The UL CI 201 corresponds to cancelation of uplink transmission in an uplink transmission resource within a reference uplink time-frequency resource region such as but not limited to, an uplink resource region (RUR) 202. In particular, the UL CI 201 is used to indicate or otherwise identify cancelation of transmission of an uplink service carried on an uplink resource (e.g., the PUSCH 134) within the RUR 202 corresponding to the UL CI 201.

In some embodiments, the RUR 202 can be divided into time-frequency resource sub-blocks. Each bit in the DCI corresponds to a time-frequency resource sub-block. A bit value being a first value (e.g., 1) indicates that a time-frequency resource sub-block corresponding to the bit is a canceled resource (e.g., uplink transmission on that time-frequency resource sub-block is canceled). The bit value being a second value (e.g., 0) indicates that a time-frequency resource sub-block corresponding to the bit is not a canceled resource (e.g., uplink transmission on that time-frequency resource sub-block is not canceled).

In yet another example, the base station 104 can instruct the UE 102 to reduce transmission power to zero on the entire originally allocated uplink transmission resources (e.g., the PUSCH 134) or a portion thereof, to indirectly cancel the transmission of the first uplink service on the entire originally allocated uplink transmission resource (e.g., the PUSCH 134) or a portion thereof, respectively. Accordingly, in response to receiving transmission power reduction commands/signals from the base station 104, the UE 102 cancels transmission on the entire originally allocated uplink transmission resource (e.g., the PUSCH 134) or a portion thereof.

The cancelled transmission can also be a PUSCH in configured grant (CG) resource (e.g.g., CG-PUSCH). The CG resources are configured to the UE through radio resource control (RRC) signaling (e.g., configuredGrant-Config), so that the UE can transmit the uplink transmission on the CG resource without a UL grant. The UE will not transmit anything on the resources configured if the higher layers did not deliver a transport block to transmit on the resources allocated for uplink transmission without the UL grant.

Figure 3:
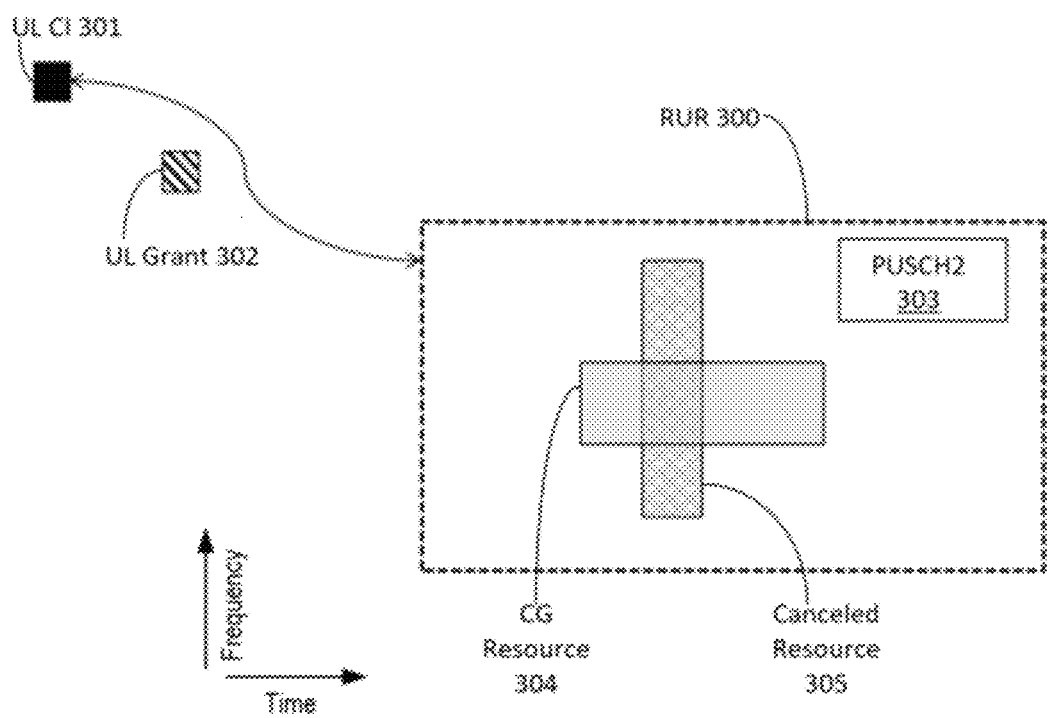
FIG. 3 is a schematic diagram illustrating an example uplink resource region (RUR), in accordance with some embodiments of the present disclosure.

In that regard, FIG. 3 is a schematic diagram illustrating an example RUR 300, in accordance with some embodiments of the present disclosure. FIG. 3 has the time domain as a horizontal axis and frequency (e.g., a bandwidth, an active uplink bandwidth part (BWP), a carrier, etc.) as a vertical axis. Referring to FIGS. 1-3, the RUR 300 is an example of the RUR 202. UL grant 302 is an example of UL grant 124. The RUR 300 is shown as a rectangle defined by dashed lines. As shown in FIG. 3, in the case in which a canceled resource 305. which is cancelled by UL CI 301, overlaps with a CG resource 304 of the UE, gNB ["gNodeB"] does not know whether the uplink transmission will be transmitted on the CG resource 304 or whether the UE will cancel the uplink transmission. As such, the issue is under which conditions a UL grant 302 for PUSCH2 303 can be transmitted by the network side node.

In wireless communication system, a control resource set (CORESET) includes one or more resource blocks (RBs) in the frequency domain and one or more orthogonal frequency division multiplexing (OFDM) symbols in the time domain. One or more physical downlink control channel (PDCCH) candidates are transmitted in a CORESET. The configuration parameters of CORESET are configured by the network for a UE, including CORESET index, frequency domain resource, CORESET duration, etc. One or more CORESETs may be configured for a UE for monitoring PDCCH.

In wireless communication system, one or more search space sets are configured by the network for a UE. The configuration parameters of a search space set include search space index, associated CORESET index, PDCCH monitoring periodicity and offset, search space duration, PDCCH monitoring pattern within a slot, search space type, etc. In general, there are two types of search space, UE-specific search space (USS) and common search space (CSS). A search space type also indicates the downlink control information (DCI) formats that a UE monitors. A search space set is associated with a CORESET. PDCCH monitoring periodicity and offset indicates the slots on which a UE needs to monitor PDCCH. According to a search space set configuration and the associated CORESET configuration, a UE is configured to monitor corresponding PDCCH with DCI formats indicated by the search space type on the resources indicated by the CORESET in the slots indicated by the PDCCH monitoring periodicity and offset.

Figure 4:
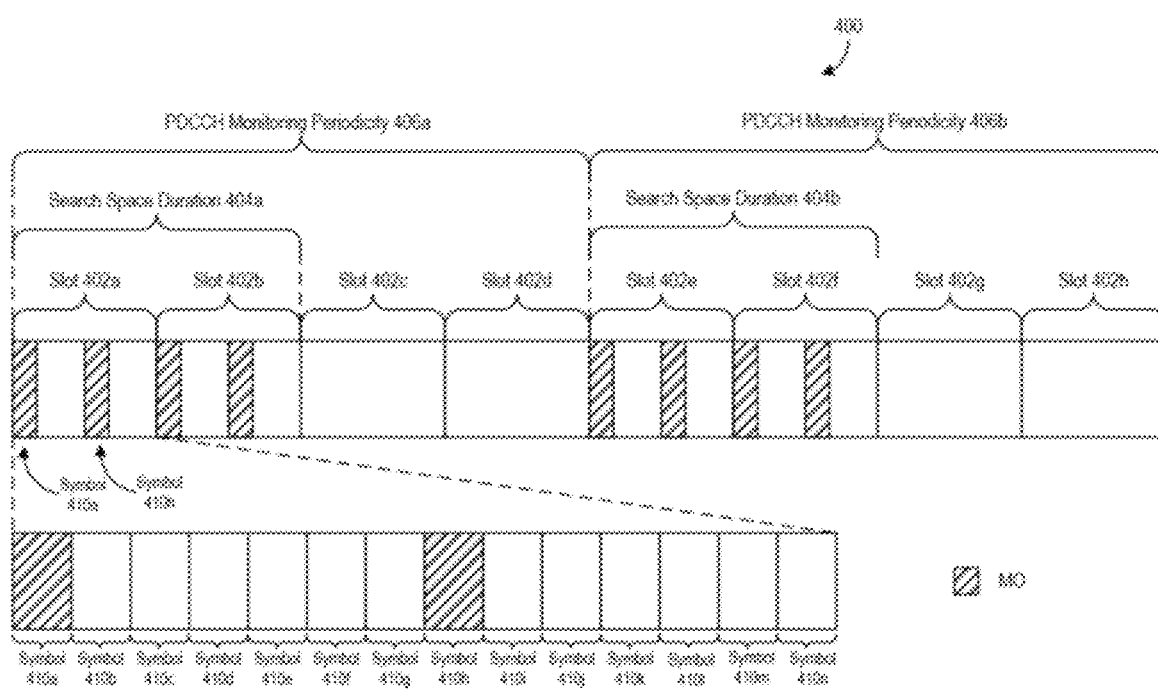
FIG. 4 is a diagram illustrating a slot structure corresponding to an example configuration 400 of PDCCH monitoring occasions, according to various embodiments.

FIG. 4 is a diagram illustrating a slot structure corresponding to an example configuration 400 of PDCCH monitoring occasions, according to various embodiments. Referring to FIG. 4, the configuration 400 corresponds to slots 402$a$, 402$b$, 402$c$, 402$d$, 402$e$, 402$f$, 402$g$, and 402$h$ (collectively the slots 402$a$-402$h$). A PDCCH monitoring periodicity is a periodicity by which a UE monitors PDCCH. In the configuration 400, the PDCCH monitoring periodicity is 4 slots. That is, the slots 402$a$-402$d$ are in a PDCCH monitoring periodicity 406$a$, and the slots 402$e$-402$h$ are in a PDCCH monitoring periodicity 406$b$. The PDCCH monitoring offset in the configuration 400 is 0 (e.g., no offset). A search space duration in the configuration 400 is 2 slots. As shown, within the PDCCH monitoring periodicity 406$a$, a search space duration 404$a$ includes slots 402$a$ and 402$b$. Within the PDCCH monitoring periodicity 406$b$, a search space duration 404$b$ includes slots 402$e$ and 402$f$. In the configuration 400, 2 PDCCH Monitoring Occasions (MOs) are configured in a given slot within the search duration 404$a$ or 404$b$. For example, the slot 402$a$ includes 44 OFDM symbols 410$a$, 410$b$, 410$c$, 410$d$, 410$e$, 410$f$, 410$g$, 410$h$, 410$i$, 410$j$, 410$k$, 410$l$, 410$m$, and 410$n$ (collectively symbols 410$a$-410$n$). Symbols 410$a$ and 410$h$ are configured as first symbols of MOs. Therefore, there are 4 total MOs within each PDCCH monitoring period. For instance, the symbols 410$a$ and 410$h$ as well as two additional first symbols of MOs in the slot 402$b$ are within PDCCH monitoring periodicity 406$a$. Two first symbols of MOs in each of slots 402$e$ and 402$f$ are within PDCCH monitoring periodicity 406$b$. In each of MO, the UE monitors PDCCH within one resource configured via CORESET.

In a wireless communication system, one or more control channel elements (CCE) aggregation level (AL) can be configured for a search space. For each AL, there are one or more PDCCH candidates, and each PDCCH candidate has a PDCCH candidate index. A PDCCH includes one or more CCEs, and each CCE has a CCE index. For a specific search space, a predefined formula can determine the CCE indexes for a specific AL that correspond to a specific PDCCH candidate index.

For UL CI monitoring, only one AL can be configured, and only one PDCCH candidate is defined for the configured AL. The UE will then only monitor UL CI in the defined PDCCH candidate with the configured AL. The PDCCH candidate for the UL CI under the configured AL is defined as at least one of the following PDCCH candidates: 1) the first PDCCH candidate without configured for DCI format 2_0 under the configured AL for UL CI; 2) the second PDCCH candidate under the configured AL for UL CI; 3) the third PDCCH candidate under the configured AL for UL CI; 4) the last PDCCH Candidate under the configured AL for UL CI; or 5) the PDCCH candidate index under the configured AL for UL CI that is configured via RRC signaling, MAC signaling, or a combination of RRC signaling and MAC signaling. For example, a list of PDCCH candidates with N PDCCH candidate indexes is configured via RRC signaling, and for N=4, the PDCCH candidate index is 1, 3, 4, and 5. One of the indexes can be further indicated through MAC signaling (e.g., $\log_2^N=2$ bits in MAC signaling), so that "00" represents "PDCCH candidate index 1", "01" represents "PDCCH candidate index 3", "10" represents "PDCCH candidate index 4" and "11" represents "PDCCH candidate index 5."

In a wireless communication system, in order for a base station (BS) to understand a terminal's uplink power usage more accurately, a Power Headroom Report (PHR) mechanism is supported. In other words, according to a configuration of the base station, the terminal will report the power headroom (PH) or report both the PH and the maximum transmission power (Pcmax), when a certain trigger condition is met.

For Power Headroom report, a type1 PH report and a type3 PH report have been defined in New Radio (NR) system. The UE determines the type1 PH report for an activated serving cell based on an actual PUSCH transmission or a reference format. The UE determines the type3 PH report for an activated serving cell based on an actual sounding reference signal (SRS) transmission or a reference SRS transmission. Focusing on the type1 PH report, there are two types of PUSCH transmission: DG (DCI scheduled grant) PUSCH and CG PUSCH. The DG PUSCH is scheduled by gNB dynamically, and the CG PUSCH is configured by gNB semi-statically. Additionally, the gNB can configure high or low priority for each CG PUSCH semi-statically.

In Carrier Aggregation (CA) or Dual Connectivity (DC) scenario, once a PH report triggered, the UE will feedback one or multiple activated serving cells' type 1 PH reports in a PUSCH. For each activated serving cell, an actual or virtual PH report is determined by the UE and feedback to the gNB. For an activated serving cell, if multiple CG PUSCHs overlaps in time domain, the CG PUSCH carrying the PH report is defined so that the UE and gNB have the same understanding for the PH report.

A UE can feed back the PH report to the base station in a PH report medium access control (MAC) control element (CE). If the terminal does not support multiple cells, the terminal feeds back the PHR of a single cell in a Single Entry PHR MAC CE. If the terminal supports multiple cells, such as in CA or DC scenario, the terminal feeds back the PH report to the base station in a Multiple Entry PH report MAC CE. In addition to the PH report value, the attribute of each PH report value (i.e., whether a PH report value is actual PH report or virtual PH report) is also indicated in the PH report MAC CE.

Figure 5:
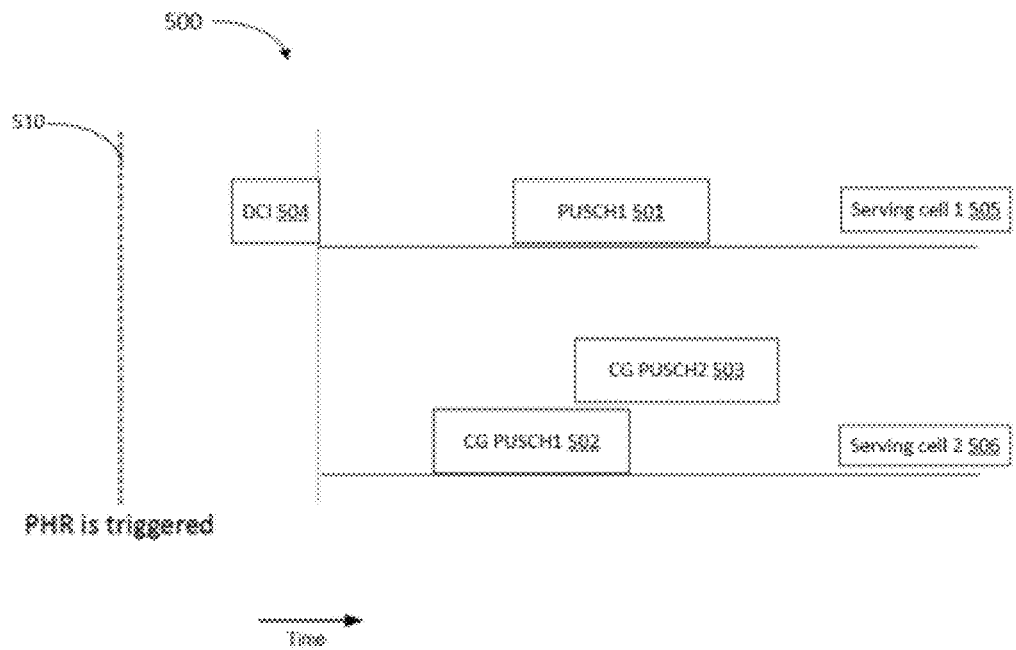
FIG. 5 is a schematic diagram illustrating an example RUR, in accordance with some embodiments of the present disclosure.

FIG. 5 is a schematic diagram of an example UE 500. FIG. 5 has the time domain as a horizontal axis. The UE 500 supports at least two uplink serving cells: Serving cell 1 505 and Serving cell 2 506. In Serving cell 1 505, an uplink transmission in PUSCH1 501 is scheduled by DCI 504. In the Serving cell 2 506, CG PUSCH1 502 and CG PUSCH2 503 are configured semi-statically by gNB, and the gNB also configures a priority of CG PUSCH1 502 and CG PUSCH2 503. CG PUSCH1 502 is configured as high priority, and CG PUSCH2 503 is configured as low priority, such that CG PUSCH1 502 and CG PUSCH2 503 are in different priority. The time domain resources allocated for CG PUSCH1 502 and CG PUSCH2 503 overlap in some time units, which can be OFDM symbol, mini-slot, or slot. Whether the UE transmits uplink data in CG PUSCH1 502 is determined based on data arrival, and the data here can be UL-SCH or something other.

After PH report is triggered at point 510, the UE 500 receives a DCI 504 scheduling PUSCH1 501 in Serving cell 1 505, so the UE 500 determines to feedback PH reports for both Serving cell 1 505 and Serving cell 2 506. The corresponding PH report MAC CE is prepared by the UE 500, the type1 PH report for Serving cell 1 505 and type1 PH report for Serving cell 2 506 are loaded in the PH report medium access control (MAC) control element (CE). In addition to the PH report value, the attribute of each PH report value (i.e., whether a PH report value is actual PH report or virtual PH report) is also indicated in the PH report MAC CE.

The PH report MAC CE is carried in PUSCH1 in Serving cell 1 505. For Serving cell 1 505, a PH report is calculated based on the actual PUSCH1 501 transmission. For Serving cell 2 506, a PH report can be determined based on at least one of the following: 1) referring to the priorities configured for CG PUSCH1 502 and CG PUSCH2 503 by gNB, UE 500 calculates an actual PH report based on whichever CG PUSCH has the high or highest priority; 2) referring to the priorities configured for CG PUSCH 1 502 and CG PUSCH 2 503 by gNB, UE 500 calculates an virtual PH report based on whichever CG PUSCH has the high or highest priority; 3) referring to the time domain positions of CG PUSCH1 502 and CG PUSCH2 503 configured by gNB, UE 500 calculates an actual PH report based on whichever CG PUSCH is first in the time domain. As shown in FIG. 5, the starting time unit (e.g., OFDM symbol, mini-slot, slot) for CG PUSCH1 502 is earlier than CG PUSCH2 503, so CG PUSCH1 502 is the first PUSCH, and the CG PUSCH2 is the second PUSCH; 4) referring to the time domain position of CG PUSCH1 and CG PUSCH 2 configured by gNB, UE 500 calculates a virtual PH report based on whichever CG PUSCH is first in the time domain. As shown in FIG. 5, the starting time unit (e.g., OFDM symbol, mini-slot, slot) for CG PUSCH1 502 is earlier than CG PUSCH2 503, so the CG PUSCH1 502 is the first PUSCH, and the CG PUSCH2 503 is the second PUSCH.

Figure 6:
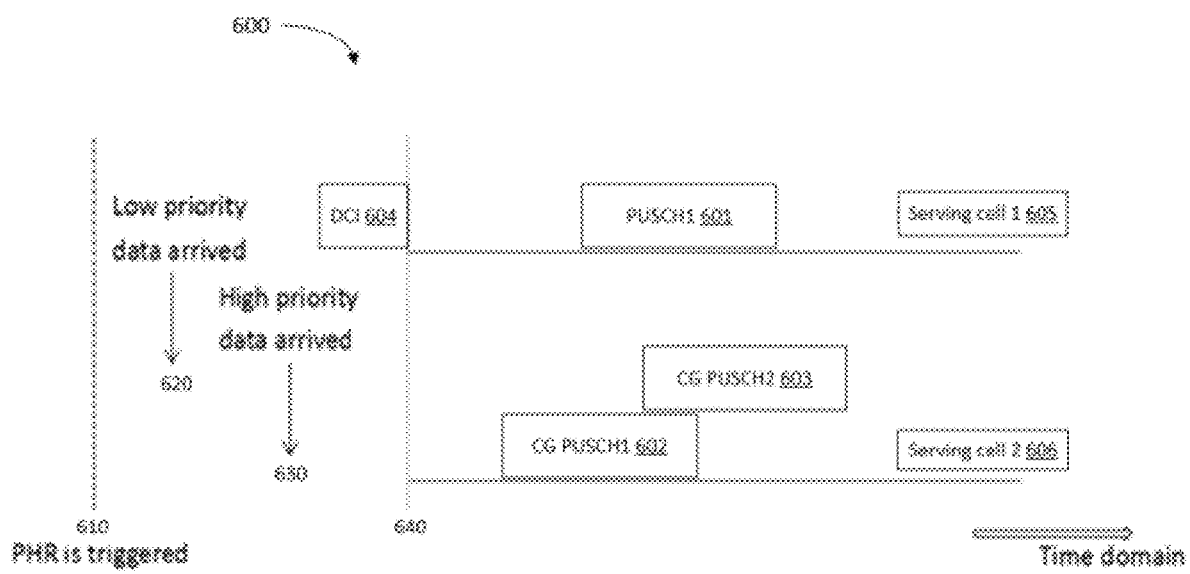
FIG. 6 is a schematic diagram illustrating an example RUR, in accordance with some embodiments of the present disclosure.

FIG. 6 is a schematic diagram of an example UE 600. FIG. 6 has the time domain as a horizontal axis. The UE 600 supports at least two uplink serving cells: Serving cell 1 605 and Serving cell 2 606. In Serving cell 1 605, an uplink transmission in PUSCH1 601 is scheduled by DCI 604. In the Serving cell 2 606, CG PUSCH1 602 and CG PUSCH2 603 are configured semi-statically by gNB, and the gNB also configures a priority of CG PUSCH1 602 and CG PUSCH2 603. CG PUSCH1 602 is configured as high priority, and CG PUSCH2 603 is configured as low priority, such that CG PUSCH1 602 and CG PUSCH2 603 are in different priority. The time domain resources allocated for CG PUSCH1 602 and CG PUSCH2 603 overlap in some time units, which can be OFDM symbol, mini-slot, or slot. Whether the UE transmits uplink data in CG PUSCH1 602 is determined based on data arrival, and the data here can be UL-SCH or something similar.

After a PH report is triggered at point 610, the UE 600 receives a DCI 604 scheduling PUSCH1 601 in Serving cell 1 605, so the UE 600 determines to feedback PH reports for both Serving cell 1 605 and Serving cell 2 606. The corresponding PH report MAC CE is prepared by the UE 600, and the type1 PH report for Serving cell 1 605 and type1 PH report for Serving cell 2 606 are loaded in the PH report medium access control (MAC) control element (CE). In addition to the PH report value, the attribute of each PH report value (i.e., whether a PH report value is actual PH report or virtual PH report) is also indicated in the PH report MAC CE.

The PH report MAC CE is carried in PUSCH1 601 in Serving cell 1 605. For Serving cell 1 605, a PH report is calculated based on the actual PUSCH1 601 transmission.

For Serving cell 2 606, CG PUSCH 1 602 is configured as low priority by gNB, and CG PUSCH 2 603 is configured as low priority by gNB. In the timeline as shown in FIG. 6, the PHR is triggered at time of 610 (t0), DCI 604 is received by UE 600 at point 640 (t3), the low priority data is arrived from higher layer to PHY layer at point 620 (t1), and the high priority data is arrived from higher layer to PHY layer at point 630 (t2). The low priority data should be loaded into CG PUSCH1 602, and the high priority data should be loaded into CG PUSCH2 603. 620 and 630 are both before 640. Because of the overlapping between the time domain resource allocations of CG PUSCH1 602 and CG PUSCH2 603, for the transmission of CG PUSCH1 602 and CG PUSCH2 603, there are three possibilities: 1) UE 600 transmits both CG PUSCH1 602 and CG PUSCH2 603; 2) UE 600 transmits none of CG PUSCH1 602 and CG PUSCH2 603; 3) UE 600 transmits one of CG PUSCH1 602 and CG PUSCH2 603.

The method to determine the PH report for Serving cell 2 606 by the UE 600 depends on at least one of the following possibilities: 1), referring to the priorities configured for CG PUSCH1 602 and CG PUSCH2 603 by gNB, UE 600 calculates an actual PH report based on whichever CG PUSCH has the high or highest priority; 2) referring the priorities configured for CG PUSCH1 602 and CG PUSCH2 603 by gNB, UE 600 calculates a virtual PH report based whichever CG PUSCH has the high or highest priority; 3) UE 600 determines an actual PH report based on which CG PUSCH is transmitted to send data. If CG PUSCH1 602 is transmitted to send data, the UE 600 determines an actual PH report based on CG PUSCH1 602. If CG PUSCH2 603 is transmitted to send data, the UE 600 determines an actual PH report based on CG PUSCH2 603.

Figure 7:
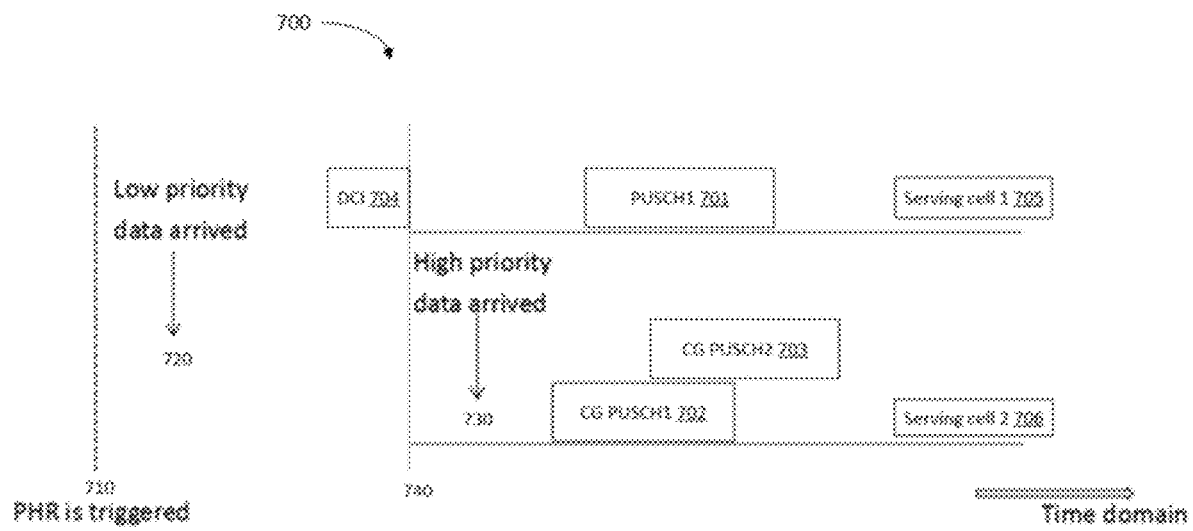
FIG. 7 is a schematic diagram illustrating an example RUR, in accordance with some embodiments of the present disclosure.

FIG. 7 is a schematic diagram of an example UE 700. FIG. 7 has the time domain as a horizontal axis. The UE 700 supports at least two uplink serving cells: Serving cell 1 705 and Serving cell 2 706. In the Serving cell 1 705, uplink transmission in PUSCH1 701 is scheduled by DCI 704. In the Serving cell 2 706, CG PUSCH1 702 and CG PUSCH2 703 are configured semi-statically by gNB, and the gNB also configures a priority of CG PUSCH1 702 and CG PUSCH2 703. CG PUSCH1 702 is configured as high priority, and CG PUSCH2 703 is configured as low priority, such that CG PUSCH1 702 and CG PUSCH2 703 are in different priority. The time domain resources allocated for CG PUSCH1 702 and CG PUSCH2 703 overlap in some time units, which can be OFDM symbol, mini-slot or slot. Whether the UE transmits uplink data in CG PUSCH 1 is determined based on data arrival, and the data here can be UL-SCH or something similar.

After PH report is triggered at point 710, the UE 700 receives a DCI 704 scheduling PUSCH1 701 in Serving cell 1 705, so the UE 700 determines to feedback PH reports for both Serving cell 1 705 and Serving cell 2 706. The corresponding PH report MAC CE is prepared by the UE 700, the type1 PH report for Serving cell 1 705 and type1 PH report for Serving cell 2 706 are loaded in the PH report medium access control (MAC) control element (CE). In addition to the PH report value, the attribute of each PH report value (i.e., whether a PH report value is actual PH report or virtual PH report) is also indicated in the PH report MAC CE.

The PH report MAC CE is carried in PUSCH1 701 in Serving cell 1 705. For Serving cell 1 705, a PH report is calculated based on the actual PUSCH1 701 transmission.

For Serving cell 2 706, CG PUSCH 1 702 is configured as low priority by gNB, and CG PUSCH 2 703 is configured as low priority by gNB. In the timeline as shown in FIG. 7, PHR is triggered at time of 710 (t0), DCI 704 is received by UE 700 at time of 740 (t3), the low priority data is arrived from higher layer to PHY layer at time of 720 (t1), and the high priority data is arrived from higher layer to PHY layer at time of 730 (t2). 720 is before 740, and 730 is after 740. The low priority data should be loaded into CG PUSCH1 702, and the high priority data should be loaded into CG PUSCH2 703. For Serving cell 2 706, a PH report can be determined based on at least one of the following: 1) based on the CG PUSCH whose data arrival time (720 or 730) is before the DCI receiving time 740. As shown in FIG. 7, 720 is before 740, so the UE 700 determines PH report based on CG PUSCH1 702. In this example, if the UE 700 transmits data in CG PUSCH 1 702, the UE determines an actual PH report based on CG PUSCH 1. If the UE do not transmit data in CG PUSCH1, the UE determines a virtual PH report; 2) based on the CG PUSCH whose data arrival time (720 or 730) is before the DCI receiving time 740. As shown in FIG. 7, 720 is before 740, so the UE 700 determines PH report based on CG PUSCH1 702. In this example, the UE 700 always determines an actual PH report, regardless of whether there is data transmitted in CG PUSCH1 702; 3) based on the CG PUSCH whose data arrival time (720 or 730) is before the DCI receiving time 740. As shown in FIG. 7, 720 is before 740, so the UE 700 determines PH report based on CG PUSCH1 702. In this example, the UE 700 always determines an virtual PH report, regardless of whether there is data transmitted in CG PUSCH1 702.

In FIGS. 5, 6, and 7, PUSCH1 (501, 601, or 701) in Serving cell 1 (505, 605, or 705) also can be a CG PUSCH. If PUSCH1 in Serving cell 1 is a CG PUSCH, then t3 (640 or 740) can be a time that the UE (500, 600, or 700) determines to feedback PHR in PUSCH1.

In a first method related to a conditional definition of a UL grant transmission after a UL CI, a UE can be scheduled by a UL grant for PUSCH2 in response to determining that a PDCCH carrying the UL grant with starting symbol is located after the ending symbol of a PDCCH carrying UL CI by a time interval equal to or larger than a predefined value. As shown in FIG. 5, in the case in which the resource indicated by the UL CI overlaps with a CG resource (e.g., a PUSCH resource configured through RRC signaling, such as configuredGrantConfig) of the UE, the gap between an end of a PDCCH carrying the UL CI and a start of a PDCCH carrying the UL grant for PUSCH2 should be no less than a predefined value (e.g., X1). In other words, a network (e.g., one or more base stations) transmits a UL grant for scheduling PUSCH2 to a UE in response to determining that the UL grant is a predefined time interval after the end of PDCCH carrying the UL CI. A value of X1 is configured through RRC signaling or provided in the specification. Alternatively, in response to determining that the resource indicated by the UL CI does not overlap with the CG resource of the UE, there will be no cancellation operation for the UE, so the UE can receive a UL grant with an ending symbol no earlier than the first symbol of the PDCCH carrying UL CI without having to wait the predefined time gap.

Figure 8:
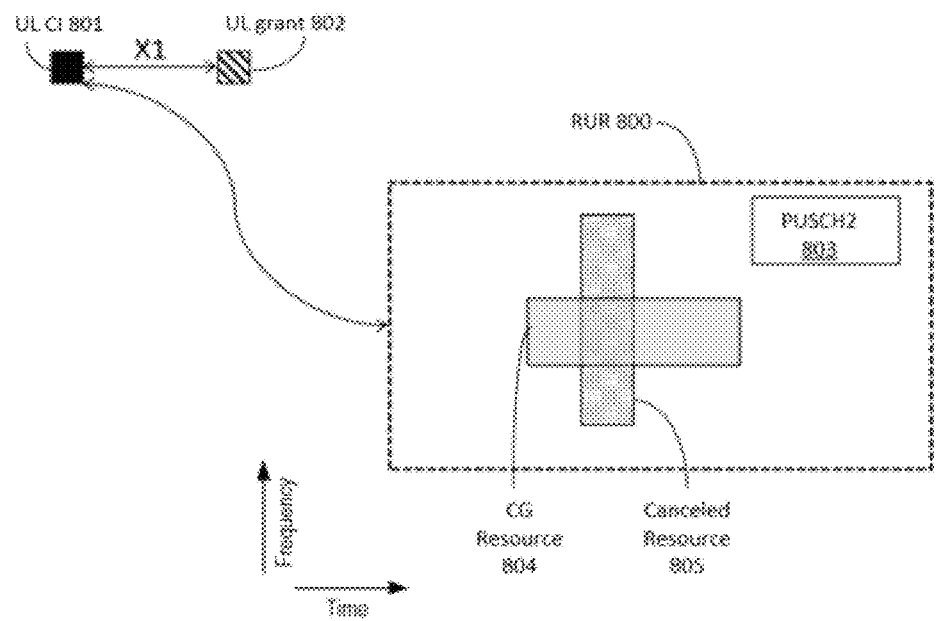
FIG. 8 is a schematic diagram illustrating an example RUR, in accordance with a first method.

FIG. 5 is a schematic diagram illustrating an example RUR 800, in accordance with the first method. FIG. 8 has the time domain as a horizontal axis and frequency (e.g., a bandwidth, an active uplink bandwidth part (BWP), a carrier, etc.) as a vertical axis. Referring to FIGS. 1-5, the RUR 800 is an example of the RUR 202. UL grant 802 is an example of UL grant 124. UL CI 802 is an example of UL CI 201. The RUR 300 is shown as a rectangle defined by dashed lines. As shown in FIG. 8, a canceled resource 805, which is indicated by UL CI 801, overlaps with a CG resource 804. A PUSCH2 803, which corresponds to UL grant 802, is able to be scheduled because UL grant 802 is located X1 symbols in time after the UL CI 801.

In a second method related to a conditional definition of a UL grant transmission after a UL CI, a UE can be scheduled by a UL grant for a PUSCH (e.g., PUSCH 2) in response to determining that a first symbol of a PDCCH carrying the UL grant is located after the ending symbol of a PDCCH carrying UL CI by a time interval equal to or larger than a predefined value. In the case in which the resource indicated by a UL CI overlaps with a PUSCH resource of a UE either configured by RRC signaling (e.g., a CG resource) or scheduled by a UL grant with an ending symbol earlier than a first symbol of the UL CI, the gap between the end of a PDCCH carrying the UL CI and the start of a PDCCH carrying the UL grant for PUSCH2 should be no less than a predefined value (e.g., X1). In other words, a network (e.g., one or more base stations) transmits a UL grant for scheduling PUSCH2 to a UE in response to determining that the UL grant is a predefined time interval after the end of the PDCCH carrying the UL CI. The value of X1 is configured through RRC signaling or provided in the specification. Alternatively, in response to determining that the resource indicated by a UL CI does not overlap with a PUSCH resource of a UE either configured by RRC signaling or scheduled by a UL grant, there will be no cancelation operation for the UE, so the UE can receive a UL grant with an ending symbol no earlier than the first symbol of the PDCCH carrying UL CI, without the restriction of the predefined time gap.

In a third method related to a conditional definition of a UL grant transmission after a UL CI, in the case in which a resource indicated by a first UL CI (e.g., UL CI1) overlaps with a CG resource (e.g., a PUSCH resource configured through RRC signaling such as configuredGrantConfig) of a UE, the UE can be scheduled by a UL grant for another PUSCH in response to determining that the ending symbol of a PDCCH carrying the UL grant is no earlier in time than the first symbol of a PDCCH carrying a next UL CI. In other words, a network (e.g., one or more base stations) transmits a UL grant for scheduling PUSCH2 to a UE in response to determining that the UL grant occurs after another UL CI (later than the UL CI that indicates an overlapping resource). The UE will not receive a PDCCH carrying a UL grant in response to determining that the ending symbol of the PDCCH carrying the UL grant is earlier than the first symbol of a PDCCH carrying a next UL CI after UL CI1 in time (e.g., UL CI2). Alternatively, in response to determining that the resource indicated by UL CI1 does not overlap with a CG resource of the UE, there will be no cancelation operation for the UE, so the UE can receive a UL grant with an ending symbol no earlier than the first symbol of the PDCCH carrying UL CI.

Figure 9:
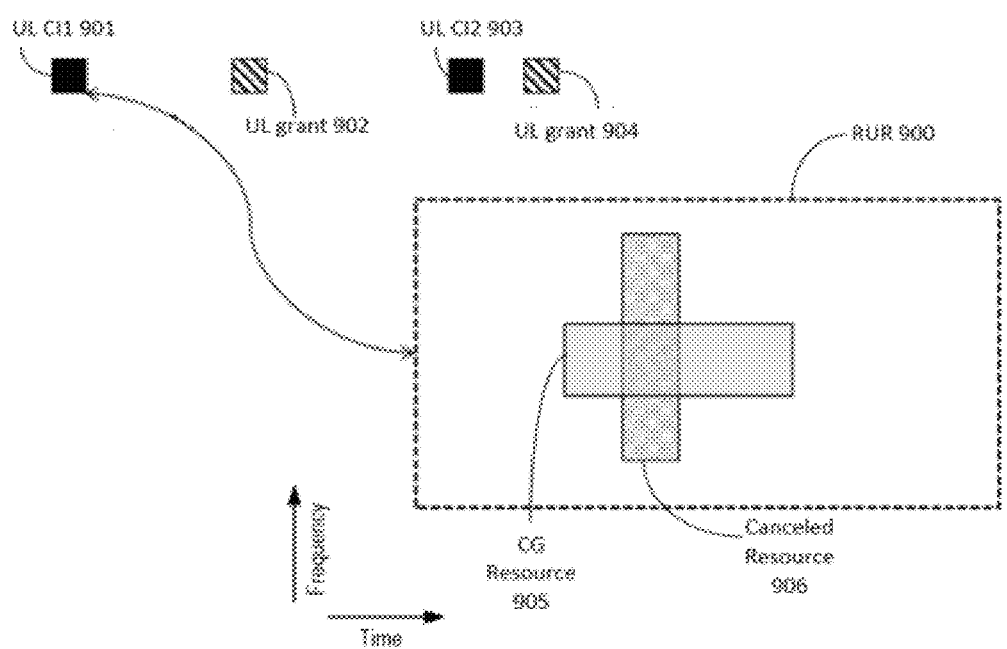
FIG. 9 is a schematic diagram illustrating an example RUR, in accordance with a third method.

FIG. 9 is a schematic diagram illustrating an example RUR 900, in accordance with the third method. FIG. 9 has the time domain as a horizontal axis and frequency (e.g., a bandwidth, an active uplink bandwidth part (BWP), a carrier, etc.) as a vertical axis. Referring to FIGS. 1-6, the RUR 900 is an example of the RUR 202. UL grant 902 and 904 are examples of UL grant 124. UL CI1 902 and UL CL2 904 are examples of UL CI 201. The RUR 900 is shown as a rectangle defined by dashed lines. As shown in FIG. 9, in the case in which a CG resource 905 overlaps with a canceled resource 906 that was indicated by UL CI1 901, a UL grant 902 that is after UL CI1 901 but earlier in time than UL CI2 903 will not be allowed to be transmitted. However, a UL grant 904 that is after both UL CI1 901 and UL CI2 903 in time will allow to be transmitted.

In a fourth method related to a conditional definition of a UL grant transmission after a UL CI, in the case in which a resource indicated by a first UL CI (e.g., UL CI1) overlaps with a PUSCH resource of a UE either configured by RRC signaling or scheduled by a UL grant with an ending symbol earlier than a first symbol of the UL CI, the UE can be scheduled by a UL grant for another PUSCH in response to determining that an ending symbol of a PDCCH carrying the UL grant is not earlier than a first symbol of a PDCCH carrying a next UL CI (e.g., UL CI2). The UE will not receive a PDCCH carrying the UL grant in response to determining that an ending symbol of the PDCCH carrying the UL grant is earlier than a first symbol of the PDCCH carrying UL CI2. In other words, a network (e.g., one or more base stations) can transmit a UL grant for scheduling PUSCH2 to a UE in response to determining that the UL grant occurs after another UL CI (later than the UL CI that indicates an overlapping resource). Alternatively, in response to determining that the resource indicated by UL CI1 does not overlap with a PUSCH resource of a UE either configured by RRC signaling or scheduled by a UL grant, there will be no cancelation operation for the UE, so the UE can receive a UL grant with an ending symbol no earlier than the first symbol of the PDCCH carrying UL CI.

Figure 10:
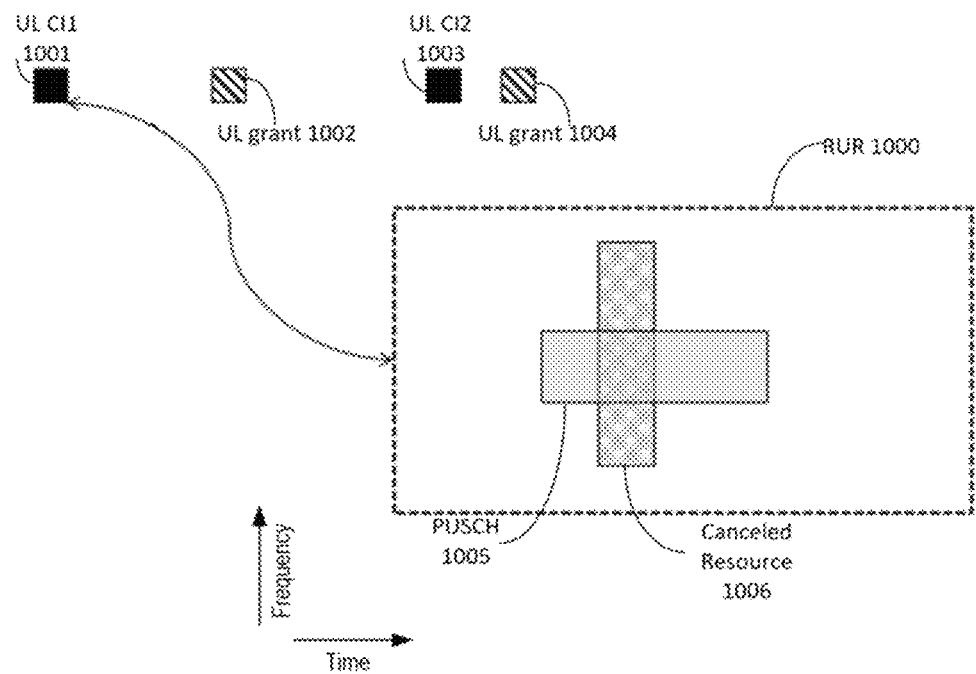
FIG. 10 is a schematic diagram illustrating an example RUR, in accordance with a fourth method.

FIG. 10 is a schematic diagram illustrating an example RUR 1000, in accordance with the fourth method. FIG. 10 has the time domain as a horizontal axis and frequency (e.g., a bandwidth, an active uplink bandwidth part (BWP), a carrier, etc.) as a vertical axis. Referring to FIGS. 1-7, the RUR 1000 is an example of the RUR 202. UL grant 1002 and 1004 are examples of UL grant 124. UL CI1 1001 and UL CL2 1003 are examples of UL CI 201. The RUR 1000 is shown as a rectangle defined by dashed lines. As shown in FIG. 10, in the case in which a PUSCH 1005, which was either configured by signaling or scheduled by another UL grant, overlaps with a canceled resource 1006 that was indicated by UL CI1 1001, a UL grant 1002 that is after UL CI1 1001 but earlier in time than UL CI2 1003 will not allow to be transmitted. However, a UL grant 1004 that is after both UL CI1 1001 and UL CI2 1003 in time will allow to be transmitted.

In a fifth method related to a conditional location of a PUSCH scheduled by a UL grant after a UL CI, a UL grant is allowed to be transmitted to a UE in response to determining that a PUSCH (e.g., PUSCH2) scheduled by the UL grant starts later than the ending symbol of a first PUSCH resource of the UE either configured by RRC signaling or scheduled by another different UL grant. The another different UL grant has an ending symbol earlier than a first symbol of the PDCCH carrying the UL CI. In other words, a network (e.g., one or more base stations) transmits a UL grant to a UE in response to determining that PUSCH2, scheduled by the UL grant, does not overlap with the earlier PUSCH.

Figure 11:
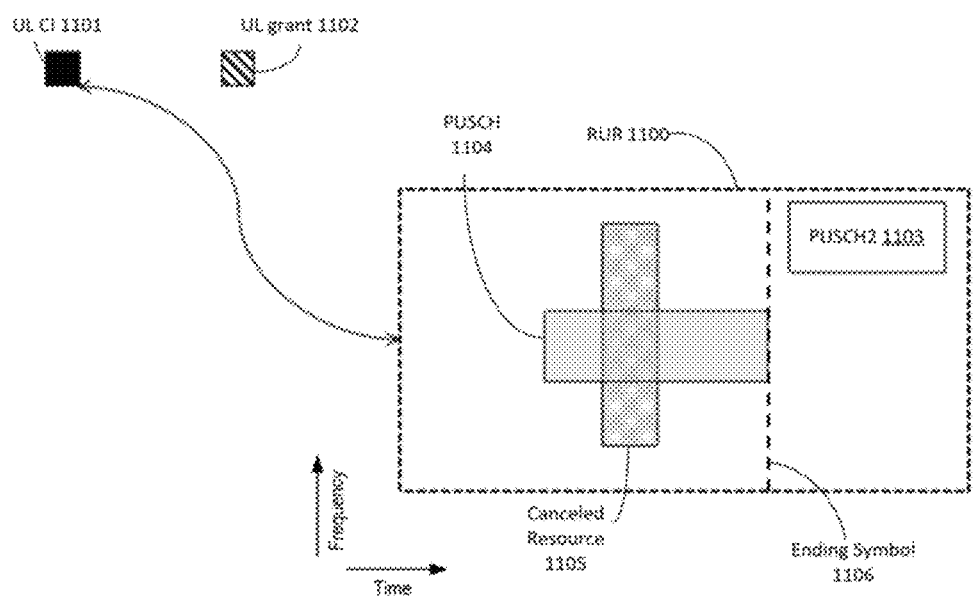
FIG. 11 is a schematic diagram illustrating an example RUR, in accordance with a fifth method.

FIG. 11 is a schematic diagram illustrating an example RUR 1100, in accordance with the fifth method. FIG. 11 has the time domain as a horizontal axis and frequency (e.g., a bandwidth, an active uplink bandwidth part (BWP), a carrier, etc.) as a vertical axis. Referring to FIGS. 1-8, the RUR 1100 is an example of the RUR 202. UL grant 1102 is an example of UL grant 124. UL C1 1101 is an example of UL CI 201. The RUR 1100 is shown as a rectangle defined by dashed lines. As shown in FIG. 11, in the case in which a PUSCH 1104, which was either configured by signaling or scheduled by another UL grant, overlaps with a canceled resource 1105 that was indicated by UL CI 1101, a UL grant 1102 that is associated with PUSCH2 1103 is scheduled because PUSCH2 1103 begins after an ending symbol 1106 of PUSCH 1104.

In a sixth method related to a conditional location of a PUSCH scheduled by a UL grant after a UL CI, a UL grant is allowed to be transmitted to a UE in the case in response to determining that a PUSCH scheduled by a UL grant (e.g., PUSCH2) does not overlap with the resource indicated by the UL CI. As such, PUSCH2 starts later than an end of the ending symbol of a first PUSCH resource (PUSCH1) of the UE either configured by RRC signaling or scheduled by a different UL grant with an ending symbol earlier than a first symbol of the UL CI, when PUSCH1 initially overlapped with the resource indicated by the UL CI. In other words, a network (e.g., one or more base stations) transmits an UL grant to a UE in response to determining that PUSCH2, scheduled by the UL grant, does not overlap with the canceled resource indicated by the UL CI.

Figure 12:
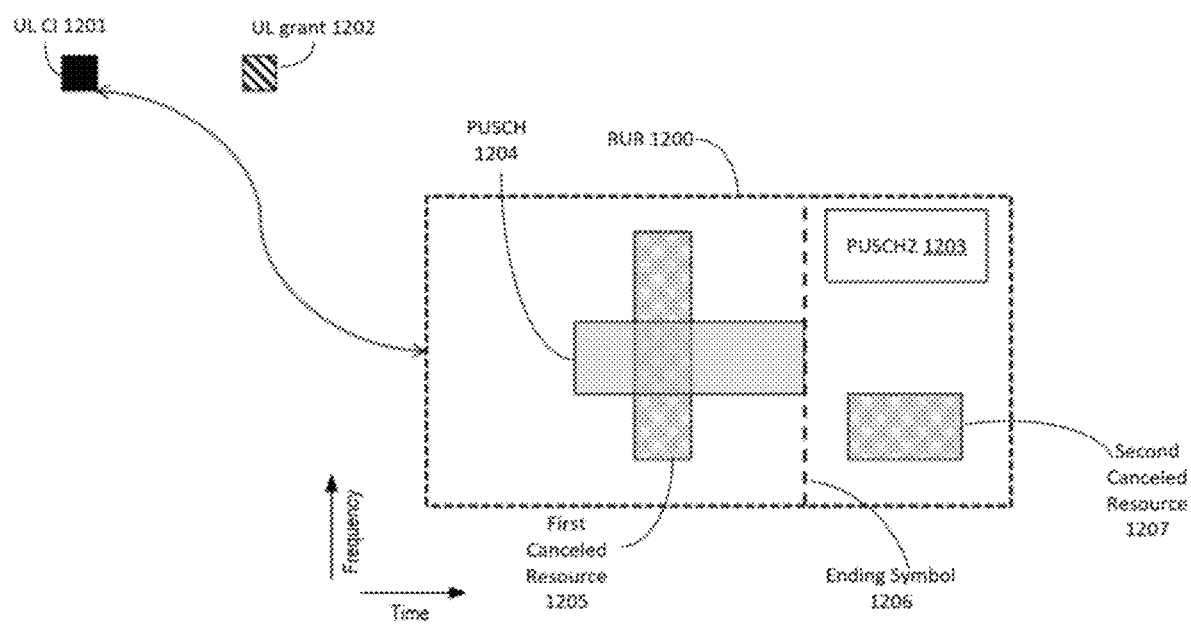
FIG. 12 is a schematic diagram illustrating an example RUR, in accordance with a sixth method.

FIG. 12 is a schematic diagram illustrating an example RUR 1200, in accordance with the sixth method. FIG. 12 has the time domain as a horizontal axis and frequency (e.g., a bandwidth, an active uplink bandwidth part (BWP), a carrier, etc.) as a vertical axis. Referring to FIGS. 1-9, the RUR 1200 is an example of the RUR 202. UL grant 1202 is an example of UL grant 124. UL CI 1201 is an example of UL CI 201. The RUR 1200 is shown as a rectangle defined by dashed lines. As shown in FIG. 12, in the case in which a PUSCH 1204, which was either configured by signaling or scheduled by another UL grant, overlaps with a canceled resource 1205 that was indicated by UL CI 1201, a UL grant 1202 that is associated with PUSCH2 1203 can be transmitted because PUSCH2 1203 begins after an ending symbol 1206 of PUSCH 1204. Further, PUSCH2 1203 does not overlap with a second canceled resource 1207 that was indicated by UL CI 1201.

In a seventh method related to a conditional location of a PUSCH scheduled by a UL grant after a UL CI, a UL grant is allowed to be transmitted to a UE in response to determining that a PUSCH scheduled by the UL grant (e.g., PUSCH2) does not overlap with a resource indicated by the earlier UL CI. In this situation, a network (e.g., one or more base stations) transmits an UL grant to a UE in response to determining that PUSCH2, scheduled by the UL grant, does not overlap with the canceled resource indicated by the UL CI.

Figure 13:
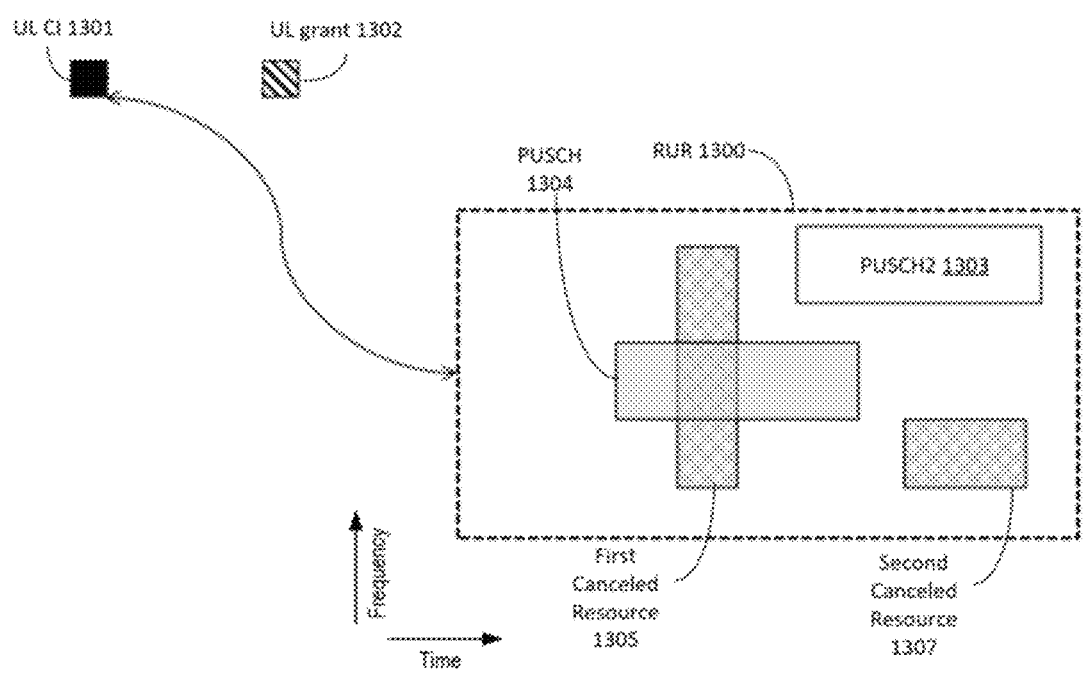
FIG. 13 is a schematic diagram illustrating an example RUR, in accordance with a seventh method.

FIG. 13 is a schematic diagram illustrating an example RUR 1300, in accordance with the seventh method. FIG. 13 has the time domain as a horizontal axis and frequency (e.g., a bandwidth, an active uplink bandwidth part (BWP), a carrier, etc.) as a vertical axis. Referring to FIGS. 1-10, the RUR 1300 is an example of the RUR 202. UL grant 1302 is an example of UL grant 124. UL CI 1301 is an example of UL CI 201. The RUR 1300 is shown as a rectangle defined by dashed lines. As shown in FIG. 13, in the case in which a PUSCH 1304, which was either configured by signaling or scheduled by another UL grant, overlaps with a first canceled resource 1305 that was indicated by UL CI 1301, a UL grant 1302 that is associated with PUSCH2 1303 is allowed to be scheduled because PUSCH2 1303 does not overlap with a first canceled resource 1305 that was indicated by UL CI 1301 Further, PUSCH2 1303 does not overlap with a second canceled resource 1307 that was indicated by UL CI 1301.

In an eighth method related to a conditional location of a PUSCH scheduled by a UL grant after a UL CI, a UL grant is allowed to be transmitted to a UE in response to determining that the second PUSCH (e.g., PUSCH2) scheduled by the UL grant starts no earlier than a first symbol after a first pre-determined point in time (e.g., A). The position of the pre-determined point in time is defined as a time gap after an ending symbol of the UL CI. This time gap, (e.g., X1), is determined as a sum of a first time interval and a second time interval. The first time interval is indicated as $T_{proc,2}A$ and the second time interval is indicated as $T_{proc,2}B+d2$ or $T_{proc,2}B$. The first time interval ($T_{proc,2}A$) is defined as a time interval for decoding a UL CI and canceling a PUSCH, and the second time interval ($T_{proc,2}B+d2$ or $T_{proc,2}B$) is defined as a time interval used for decoding a UL grant and preparing a PUSCH2. In other words, a network (e.g., one or more base stations) transmits an UL grant to a UE in response to determining that PUSCH2, scheduled by the UL grant, begins a time gap after the ending symbol of the UL CI that is equal to at least the time it takes to decode a UL CI, cancel a PUSCH, decode a UL grant, and prepare a second PUSCH.

The values of each the $T_{proc,2}A$, $T_{proc,2}B$, and d2 relate to UE capability and sub-carrier spacing (SCS) and can be either defined in the specification or configured through RRC signaling or reported by UE. Further, the values of the $T_{proc,2}A$, $T_{proc,2}B$, and d2 can be defined according to the same SCS or different SCSs. For example, if values of $T_{proc,2}A$, $T_{proc,2}B$, and d2 are determined using the SCS of PUSCH2, the value of $T_{proc,2}A$ will be equal to the value of $T_{proc,2}B$. In another example, a value of $T_{proc,2}A$ is determined according to the smaller of the SCS configuration of the PDCCH and the smallest SCS configuration provided in scs-SpecificCarrierList of FrequencyInfoUL or FrequencyInfoUL-SIB, while a value of $T_{proc,2}B$ is determined based on the SCS of PUSCH2.

Figure 14:
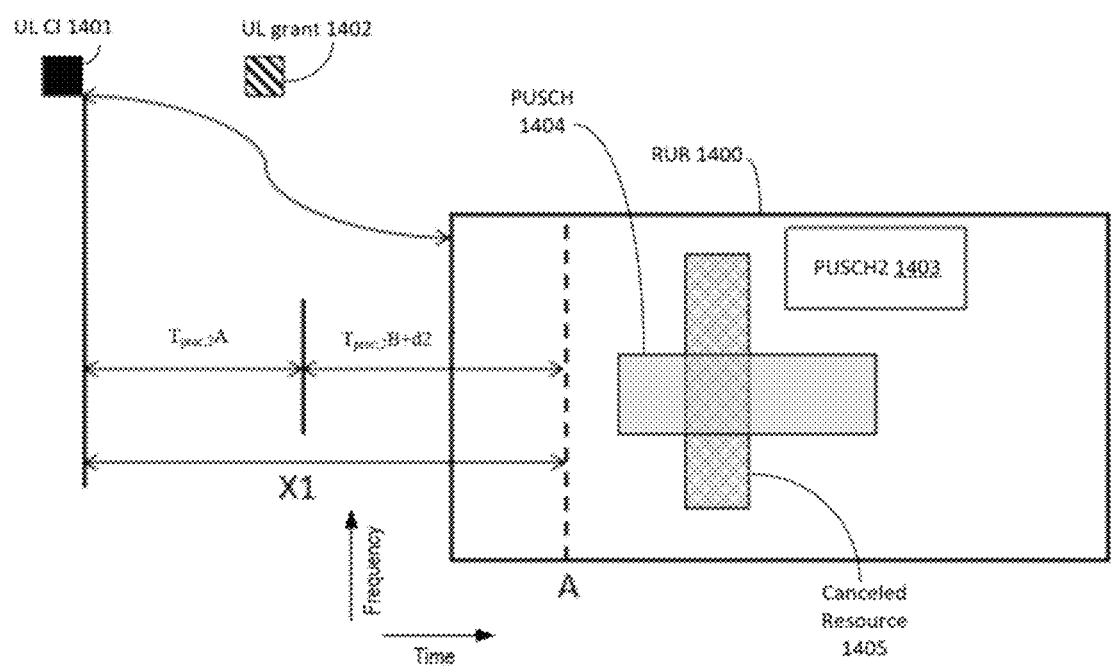
FIG. 14 is a schematic diagram illustrating an example RUR, in accordance with an eighth method.

FIG. 14 is a schematic diagram illustrating an example RUR 1400, in accordance with the eighth method. FIG. 14 has the time domain as a horizontal axis and frequency (e.g., a bandwidth, an active uplink bandwidth part (BWP), a carrier, etc.) as a vertical axis. Referring to FIGS. 1-11, the RUR 1400 is an example of the RUR 202. UL grant 1402 is an example of UL grant 124. UL CI 1401 is an example of UL CI 201. 14 As shown in FIG. 14, in the case in which a PUSCH 1404, which was either configured by signaling or scheduled by another UL grant, overlaps with a canceled resource 1405 that was indicated by UL CI 1401, a UL grant 1402 that is associated with PUSCH2 1403 is allowed to be transmitted because PUSCH2 1403 starts no earlier than point A, which is determined as being X1 symbols after an ending point of UL CI 1401. The value of X1, as shown in FIG. 14, is determined as a sum of $T_{proc,2}A$ and $T_{proc,2}B+d2$, or as a sum of $T_{proc,2}A$ and $T_{proc,2}B$.

In a ninth method related to a conditional location of a PUSCH scheduled by a UL grant after a UL CI, a UL grant is allowed to be transmitted to a UE in response to determining that a second PUSCH scheduled by that UL grant (e.g., PUSCH2) starts no earlier than the first symbol behind a second pre-determined point in time (e.g., B). As shown in FIG. 12, a position of the second pre-determined point in time is defined as a time gap (e.g., X2) after a starting point of a canceled resource indicated by the UL CI. The position of the second pre-determined point in time may also be defined as a time gap after a starting point of a canceled portion (or cancelation part) of a first PUSCH resource that was either configured by RRC signaling or scheduled by a UL grant with an ending symbol earlier than a first symbol of the UL CI. The time gap is equal to a third time interval. The third time interval, (e.g., $T_{proc,2}B$), is defined as a time interval for decoding a UL grant and preparing the PUSCH2. In other words, a network (e.g., one or more base stations) transmits an UL grant to a UE in response to determining that PUSCH2, scheduled by the UL grant, begins a time gap after the start of a canceled resource or a canceled portion (or cancelation part) of a first PUSCH resource that is equal to the time it takes to decode a UL grant and prepare a second PUSCH. The value of the time gap relates to UE capability and SCS and can be defined in the specification or configured through RRC signaling. For example, the value of the third time interval can be defined according to the SCS of PUSCH2, the SCS of UL grant scheduling PUSCH2, or the smaller of the SCS of PUSCH2 and the SCS of UL grant scheduling PUSCH2.

Figure 15:
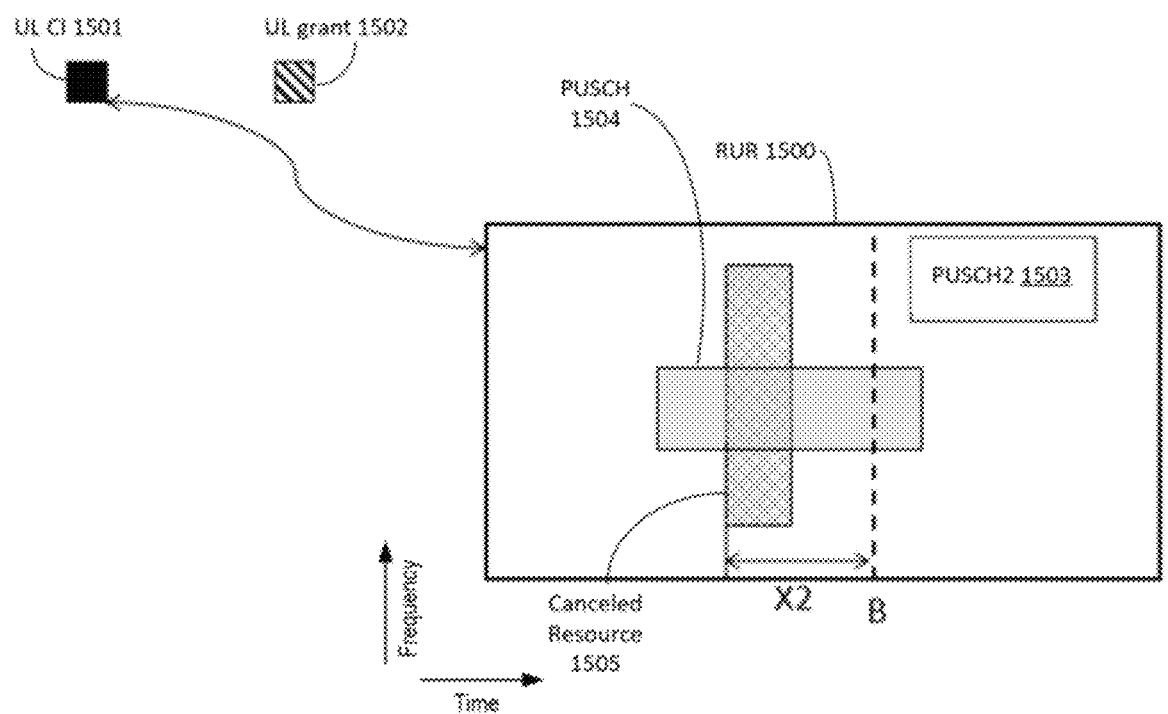
FIG. 15 is a schematic diagram illustrating an example RUR, in accordance with a ninth method.

FIG. 15 is a schematic diagram illustrating an example RUR 1500, in accordance with the ninth method. FIG. 15 has the time domain as a horizontal axis and frequency (e.g., a bandwidth, an active uplink bandwidth part (BWP), a carrier, etc.) as a vertical axis. Referring to FIGS. 1-12, the RUR 1500 is an example of the RUR 202. UL grant 1502 is an example of UL grant 154. UL CI 1501 is an example of UL CI 201. As shown in FIG. 15, in the case in which a PUSCH 1504, which was either configured by signaling or scheduled by another UL grant, overlaps with a canceled resource 1505 that was indicated by UL CI 1501, a UL grant 1502 that is associated with PUSCH2 1503 is scheduled because PUSCH2 1503 starts after point B, which is determined as being X2 symbols after a first symbol of the canceled resource 1505 or a canceled portion (or cancelation part) of a PUSCH 1504. The value of X2, as shown in FIG. 15, is determined as a value of $T_{proc,2}B$.

In a tenth method related to a conditional location of a PUSCH scheduled by a UL grant after a UL CI, a UL grant is allowed to be transmitted to a UE in response to determining that a PUSCH scheduled by the UL grant (e.g., PUSCH2) starts no earlier than a first symbol behind a third pre-determined point (e.g., C) in time. The position of the third pre-determined point in time is defined as a time gap (e.g., X3) after an ending symbol of a previous PUSCH resource that is either configured by RRC signaling or scheduled by a UL grant with an ending symbol earlier than the first symbol of the UL CI. The time gap is equal to the third time interval (e.g., $T_{proc,2}B$), which is defined above as the time interval for decoding a UL grant and preparing the PUSCH2. In other words, a network (e.g., one or more base stations) transmits an UL grant to a UE in response to determining that PUSCH2, scheduled by the UL grant, begins a time gap after a first PUSCH that is equal to the time it takes to decode a UL grant and prepare a second PUSCH. The value of the time gap relates to UE capability and SCS and can be defined in the specification or configured through RRC signaling. For example, the value of the time gap can be defined according to the SCS of PUSCH2, the SCS of UL grant scheduling PUSCH2, or the smaller of the SCS of PUSCH2 and the SCS of UL grant scheduling PUSCH2.

Figure 16:
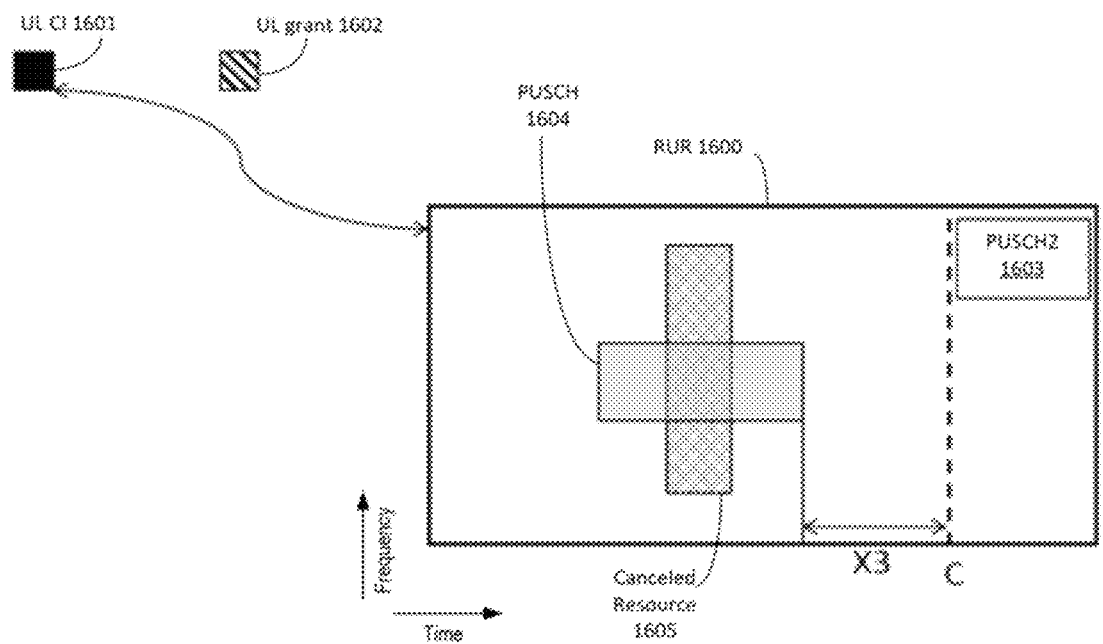
FIG. 16 is a schematic diagram illustrating an example RUR, in accordance with a tenth method.

FIG. 16 is a schematic diagram illustrating an example RUR 1600, in accordance with the tenth method. FIG. 16 has the time domain as a horizontal axis and frequency (e.g., a bandwidth, an active uplink bandwidth part (BWP), carrier, etc.) as a vertical axis. Referring to FIGS. 1-13, the RUR 1600 is an example of the RUR 202. UL grant 1602 is an example of UL grant 124. UL CI 1601 is an example of UL CI 201. As shown in FIG. 16, in the case in which a PUSCH 1604, which was either configured by signaling or scheduled by another UL grant, overlaps with a canceled resource 1603 that was indicated by UL CI 1601, a UL grant 1602 that is associated with PUSCH2 1603 is scheduled because PUSCH2 1603 starts after point C, which is determined as being X3 symbols after an ending symbol of PUSCH 1604. The value of X3, as shown in FIG. 16, is determined as a value of $T_{proc,2}B$.

In an eleventh method related to a conditional location of a PUSCH scheduled by a UL grant after a UL CI, a UL grant is allowed to be transmitted to a UE in response to determining that the second PUSCH (e.g., PUSCH2) scheduled by the UL grant starts no earlier than a first symbol after a first pre-determined point in time (e.g., A). The PUSCH2 does not overlap with a previous PUSCH resource that is either configured by RRC signaling or scheduled by a UL grant with an ending symbol earlier than the first symbol of the UL CI. The first pre-determined point in time (e.g., A) is the same as that defined in the eighth method.

FIG. 17 is a schematic diagram illustrating an example RUR 1700, in accordance with the eighth method. FIG. 17 has the time domain as a horizontal axis and frequency (e.g., a bandwidth, an active uplink bandwidth part (BWP), a carrier, etc.) as a vertical axis. Referring to FIGS. 1-16, the RUR 1700 is an example of the RUR 202. UL grant 1702 is an example of UL grant 124. UL CI 1701 is an example of UL CI 201. The RUR 1700 is shown as a rectangle defined by dashed lines. As shown in FIG. 17, in the case in which a PUSCH 1704, which was either configured by signaling or scheduled by another UL grant, overlaps with a canceled resource 1705 that was indicated by UL CI 1701, both PUSCH2 1703 between point A and point D and PUSCH2 1706 after point E can be scheduled by UL grant 1702. Point D is determined as a starting point of the previous PUSCH resource that is either configured by RRC signaling or scheduled by a UL grant with an ending symbol earlier than the first symbol of the UL CI. Point E is determined as a ending point of the previous PUSCH resource that is either configured by RRC signaling or scheduled by a UL grant with an ending symbol earlier than the first symbol of the UL CI. Point A is determined in the same way as in the eighth method. The value of X1, as shown in FIG. 17, is determined as a sum of $T_{proc,2}A$ and $T_{proc,2}B+d2$ or a sum of $T_{proc,2}A$ and $T_{proc,2}B$.

In some embodiments, one of the conditions (e.g., one of the first, second, third, fourth, fifth, seventh, eighth, ninth, tenth and eleventh methods described herein) is to be satisfied in order for a UL grant to be scheduled. In other embodiments, two or more of the conditions (e.g., one of the first, second, third, fourth, fifth, seventh, eighth, ninth, tenth and eleventh methods described herein) are to be simultaneously satisfied in order for a UL grant to be transmitted.

FIG. 18A is a schematic diagram illustrating a method 1800a for downlink control information transmission, in accordance with some embodiments. Referring to FIGS. 1-14A, the method 1800a is performed by a UE.

At 1810, the UE determines that a first resource indicated by uplink cancelation information overlaps with a second resource. At 1820, the UE receives from a network a UL grant scheduling a third resource. An ending symbol of a first downlink control channel (first PDCCH) carrying the UL grant is no earlier than a first symbol of a second downlink control channel carrying the uplink cancelation information. In some examples, the uplink cancelation information includes a UL CI. In some examples, the first resource, the second resource, and the third resource (e.g., PUSCH2) are uplink resources.

In some embodiments related to the first method, the second resource is a CG resource configured by the network via signaling (e.g., RRC signaling, etc.). A time interval (e.g., a gap) between an end of the second downlink control channel carrying the uplink cancelation information and a start of the first downlink control channel carrying the UL grant is no less than a predetermined threshold. In some examples, an end of the second downlink control channel carrying the uplink cancelation information is an ending point of an ending symbol of the second downlink control channel carrying the uplink cancelation information. A start of the first downlink control channel carrying the UL grant is a starting point of a first symbol of the first downlink control channel carrying the UL grant. The ending symbol of the second downlink control channel is the latest symbol out of all symbols of the second downlink control channel. The first symbol of the first downlink control channel is the earliest symbol out of all symbols of the first downlink control channel. The predetermined threshold is equal to a value X1. A value of X1 is configured through RRC signaling or provided in the specification In some embodiments related to the second method, the second resource is either configured by the network via signaling (e.g., RRC signaling, etc.) or scheduled by the network via another UL grant. A time interval (e.g., a gap) between an end of the second downlink control channel carrying the uplink cancelation information and a start of the first downlink control channel carrying the UL grant is no less than a predetermined threshold. The another UL grant has an ending symbol earlier than a first symbol of the second downlink control channel carrying the uplink cancelation information. In some examples, an end of the second downlink control channel carrying the uplink cancelation information is an ending point of an ending symbol of the second downlink control channel carrying the uplink cancelation information. A start of the first downlink control channel carrying the UL grant is a starting point of a first symbol of the first downlink control channel carrying the UL grant. The ending symbol of each of the second downlink control channel and the another UL grant is the latest symbol out of all symbols of the second downlink control channel and the another UL grant respectively. The first symbol of each of the first and second downlink control channel is the earliest symbol out of all symbols of the first and second downlink control channel respectively. The predetermined threshold is equal to a value X1. A value of X1 is configured through RRC signaling or provided in the specification In some embodiments related to the third method, the second resource is a CG resource configured by the network via signaling (e.g., RRC signaling, etc.). The UL grant is carried on the first downlink control channel having an ending symbol that is no earlier than a first symbol of a third downlink control channel carrying a subsequent uplink cancelation information (a next UL CI). The subsequent uplink cancelation information is received after the uplink cancelation information is received. In some examples, the ending symbol of the UL grant carried on the first downlink control channel is the latest symbol out of all symbols of the UL grant carried on the first downlink control channel. The first symbol of the third downlink control channel carrying the subsequent uplink cancelation information is the earliest symbol out of all symbols of the third downlink control channel carrying the subsequent uplink cancelation information.

In some embodiments related to the fourth method, the second resource is either configured by the network via signaling (e.g., RRC signaling, etc.) or scheduled by the network via another UL grant. The UL grant is carried on the first downlink control channel having an ending symbol that is no earlier than a first symbol of a third downlink control channel carrying a subsequent uplink cancelation information (a next UL CI). The subsequent uplink cancelation information is received after the uplink cancelation information is received. The another UL grant has an ending symbol earlier than a first symbol of the second downlink control channel carrying the uplink cancelation information. In some examples, the ending symbol of the UL grant carried on the first downlink control channel and of the another UL grant are the latest symbol out of all symbols of the UL grant carried on the first downlink control channel and the another UL grant respectively. The first symbol of the third downlink control channel carrying the subsequent uplink cancelation information and of the second downlink control channel carrying the uplink cancelation information are the earliest symbol out of all symbols of the third downlink control channel carrying the subsequent uplink cancelation information and second downlink control channel carrying the uplink cancelation information respectively.

In some embodiments related to the fifth method, the third resource starts later than an ending symbol of the second resource. The second resource is either configured by the network via signaling (e.g., RRC signaling, etc.) or scheduled by the network via another UL grant. The ending symbol of the another UL grant is earlier than a first symbol of the second downlink control channel carrying the uplink cancelation information. In some examples, the ending symbol of the second resource and of the another UL grant are the latest symbol out of all symbols of the second resource and the another UL grant respectively. The first symbol of the second downlink control channel is the earliest symbol out of all symbols of the third downlink control channel carrying the second downlink control channel.

In some embodiments related to the sixth method, the third resource does not overlap with the first resource. The third resource starts later than an ending symbol of an UL resource that is either configured by the network via signaling (e.g., RRC signaling, etc.) or scheduled by the network via another UL grant. In some examples, the ending symbol of the UL resource is the latest symbol out of all symbols in the UL resource.

In some embodiments related to the seventh method, the third resource does not overlap with the first resource, and the third resource begins no earlier than a predefined point. In some examples, the predefined point is an end of the first resource. The end of the first resource is an ending point of an ending symbol of the first resource. The ending symbol of the first resource is the latest symbol out of all symbols of the first resource.

In some embodiments related to the eighth method, the third resource begins no earlier than a predefined point. In some examples, the predefined point is a number of symbols after an end of the uplink cancellation information (UL CI). The number of symbols, in some examples, is equal to the sum of a first interval and a second interval. The first interval is indicated as $T_{proc,2}A$ and is defined as an amount of time to decode a UL CI and cancel a corresponding PUSCH. The second interval is indicated as $T_{proc,2}B+d2$ or $T_{proc,2}B$ and is defined as an amount of time to decode a UL grant and prepare a corresponding PUSCH. The end of the UL CI is the ending point of an ending symbol of the UL CI. The ending symbol of the UL CI is the latest symbol out of all symbols in the UL CI.

In some embodiments related to the ninth method, the third resource begins no earlier than a predefined point. The predefined point is a number of symbols after a start of a canceled portion of the second resource. The number of symbols, in some examples, is equal to a third interval of time. The third interval is indicated as $T_{proc,2}B$ and is defined as an amount of time to decode a UL grant and prepare a corresponding PUSCH. The start of the canceled portion of the second resource is a starting point of a first symbol of the canceled portion of the second resource. The canceled portion of the second resource is the portion of the second resource that overlaps, in time and in frequency, with the first resource that was indicated by an uplink cancelation information. The second resource is either configured by the network via signaling (e.g., RRC signaling, etc.) or scheduled by the network via another UL grant having an ending symbol earlier than a first symbol of the uplink cancelation information. The first symbol of the canceled portion of the second resource and of the uplink cancelation information are the earliest symbol out of all symbols in the canceled portion of the second resource and the uplink cancelation information respectively. The ending symbol of the second resource is the latest symbol out of all symbols in the second resource.

In some embodiments related to the tenth method, the third resource begins no earlier than a predefined point. The predefined point is a number of symbols after an end of the second resource. The number of symbols, in some examples, is equal to a third interval of time. The third interval is indicated as $T_{proc,2}B$ and is defined as an amount of time to decode a UL grant and prepare a corresponding PUSCH. The second resource is either configured by the network via signaling (e.g., RRC signaling, etc.) or scheduled by the network via another UL grant having an ending symbol earlier than a first symbol of the uplink cancelation information. The end of the second resource is an ending point of an ending symbol of the second resource. The ending symbol of the second resource is the latest symbol out of all symbols in the second resource. The first symbol of the uplink cancelation information is the earliest symbol out of all symbols in the canceled portion of the uplink cancelation information.

In some embodiments related to the eleventh method, the third resource does not overlap in time with the second resource, and the third resource begins no earlier than a predefined point. In some examples, the predefined point is defined in the same way as in the eighth method.

FIG. 18B is a schematic diagram illustrating a method 1800b for downlink control information transmission, in accordance with some embodiments. Referring to FIGS. 1-14B, the method 1800b is performed by a base station.

At 1830, the base station transmits, to a wireless communication device (e.g., UE), uplink cancelation information indicating that a first resource overlaps with a second resource of the UE. At 1840, the base station transmits, to the UE, an uplink (UL) grant scheduling a third resource (e.g., PUSCH2). An ending symbol of a first downlink control channel (first PDCCH) carrying the UL grant is no earlier than a first symbol of a second downlink control channel carrying the uplink cancelation information. In some examples, the uplink cancelation information includes a UL CI. In some examples, the first resource, the second resource, and the third resource are uplink resources.

In some embodiments related to the first method, the second resource is a CG resource configured by the network via signaling (e.g., RRC signaling, etc.). A time interval (e.g., a gap) between an end of the second downlink control channel carrying the uplink cancelation information and a start of the first downlink control channel carrying the UL grant is no less than a predetermined threshold. In some examples, an end of the second downlink control channel carrying the uplink cancelation information is an ending point of an ending symbol of the second downlink control channel carrying the uplink cancelation information. A start of the first downlink control channel carrying the UL grant is a starting point of a first symbol of the first downlink control channel carrying the UL grant. The ending symbol of the second downlink control channel is the latest symbol out of all symbols of the second downlink control channel. The first symbol of the first downlink control channel is the earliest symbol out of all symbols of the first downlink control channel. The predetermined threshold is equal to a value X1. A value of X1 is configured through RRC signaling or provided in the specification In some embodiments related to the second method, the second resource is either configured by the network via signaling (e.g., RRC signaling, etc.) or scheduled by the network via another UL grant. A time interval (e.g., a gap) between an end of the second downlink control channel carrying the uplink cancelation information and a start of the first downlink control channel carrying the UL grant is no less than a predetermined threshold. The another UL grant has an ending symbol earlier than a first symbol of the second downlink control channel carrying the uplink cancelation information. In some examples, an end of the second downlink control channel carrying the uplink cancelation information is an ending point of an ending symbol of the second downlink control channel carrying the uplink cancelation information. A start of the first downlink control channel carrying the UL grant is a starting point of a first symbol of the first downlink control channel carrying the UL grant. The ending symbol of each of the second downlink control channel and the another UL grant is the latest symbol out of all symbols of the second downlink control channel and the another UL grant respectively. The first symbol of each of the first and second downlink control channel is the earliest symbol out of all symbols of the first and second downlink control channel respectively. The predetermined threshold is equal to a value X1. A value of X1 is configured through RRC signaling or provided in the specification In some embodiments related to the third method, the second resource is a CG resource configured by the network via signaling (e.g., RRC signaling, etc.). The UL grant is carried on the first downlink control channel having an ending symbol that is no earlier than a first symbol of a third downlink control channel carrying a subsequent uplink cancelation information (a next UL CI). The subsequent uplink cancelation information is transmitted after the uplink cancelation information is received. In some examples, the ending symbol of the UL grant carried on the first downlink control channel is the latest symbol out of all symbols of the UL grant carried on the first downlink control channel. The first symbol of the third downlink control channel carrying the subsequent uplink cancelation information is the earliest symbol out of all symbols of the third downlink control channel carrying the subsequent uplink cancelation information.

In some embodiments related to the fourth method, the second resource is either configured by the network via signaling (e.g., RRC signaling, etc.) or scheduled by the network via another UL grant. The UL grant is carried on the first downlink control channel having an ending symbol that is no earlier than a first symbol of a third downlink control channel carrying a subsequent uplink cancelation information (a next UL CI). The subsequent uplink cancelation information is transmitted after the uplink cancelation information is transmitted. The another UL grant has an ending symbol earlier than a first symbol of the second downlink control channel carrying the uplink cancelation information. In some examples, the ending symbol of the UL grant carried on the first downlink control channel and of the another UL grant are the latest symbol out of all symbols of the UL grant carried on the first downlink control channel and the another UL grant respectively. The first symbol of the third downlink control channel carrying the subsequent uplink cancelation information and of the second downlink control channel carrying the uplink cancelation information are the earliest symbol out of all symbols of the third downlink control channel carrying the subsequent uplink cancelation information and second downlink control channel carrying the uplink cancelation information respectively.

In some embodiments related to the fifth method, the third resource starts later than an ending symbol of the second resource. The second resource is either configured by the network via signaling (e.g., RRC signaling, etc.) or scheduled by the network via another UL grant. The ending symbol of the another UL grant is earlier than a first symbol of the second downlink control channel carrying the uplink cancelation information. In some examples, the ending symbol of the second resource and of the another UL grant are the latest symbol out of all symbols of the second resource and the another UL grant respectively. The first symbol of the second downlink control channel is the earliest symbol out of all symbols of the third downlink control channel carrying the second downlink control channel.

In some embodiments related to the sixth method, the third resource does not overlap with the first resource. The third resource starts later than an end of an ending symbol of an UL resource that is either configured by the network via signaling (e.g., RRC signaling, etc.) or scheduled by the network via another UL grant. In some examples, the ending symbol of the UL resource is the latest symbol out of all symbols in the UL resource.

In some embodiments related to the seventh method, the third resource does not overlap with the first resource, and the third resource begins no earlier than a predefined point. In some examples, the predefined point is an end of the first resource. The end of the first resource is an ending point of an ending symbol of the first resource. The ending symbol of the first resource is the latest symbol out of all symbols of the first resource.

In some embodiments related to the eighth method, the third resource begins no earlier than a predefined point. In some examples, the predefined point is a number of symbols after an end of the uplink cancellation information (UL CI). The number of symbols, in some examples, is equal to the sum of a first interval and a second interval. The first interval is indicated as $T_{proc,2}A$ and is defined as an amount of time to decode a UL CI and cancel a corresponding PUSCH. The second interval is indicated as $T_{proc,2}B+d2$ or $T_{proc,2}B$ and is defined as an amount of time to decode a UL grant and prepare a corresponding PUSCH. The end of the UL CI is an ending point of an ending symbol of the UL CI. The ending symbol of the UL CI is the latest symbol out of all symbols in the UL CI.

In some embodiments related to the ninth method, the third resource begins no earlier than a predefined point. The predefined point is a number of symbols after a start of a canceled portion of the second resource. The number of symbols, in some examples, is equal to a third interval of time. The third interval is indicated as $T_{proc,2}B$ and is defined as an amount of time to decode a UL grant and prepare a corresponding PUSCH. The start of the canceled portion of the second resource is a starting point of a first symbol of the canceled portion of the second resource. The canceled portion of the second resource is the portion of the second resource that overlaps, in time and in frequency, with the first resource that was indicated by an uplink cancelation information. The second resource is either configured by the network via signaling (e.g., RRC signaling, etc.) or scheduled by the network via another UL grant having an ending symbol earlier than a first symbol of the uplink cancelation information. The first symbol of the canceled portion of the second resource and of the uplink cancelation information are the earliest symbol out of all symbols in the canceled portion of the second resource and the uplink cancelation information respectively. The ending symbol of the second resource is the latest symbol out of all symbols in the second resource.

In some embodiments related to the tenth method, the third resource begins no earlier than a predefined point. The predefined point is a number of symbols after an end of the second resource. The number of symbols, in some examples, is equal to a third interval of time. The third interval is indicated as $T_{proc,2}B$ and is defined as an amount of time to decode a UL grant and prepare a corresponding PUSCH. The second resource is either configured by the network via signaling (e.g., RRC signaling, etc.) or scheduled by the network via another UL grant having an ending symbol earlier than a first symbol of the uplink cancelation information. The end of the second resource is an ending point of an ending symbol of the second resource. The ending symbol of the second resource is the latest symbol out of all symbols in the second resource. The first symbol of the uplink cancelation information is the earliest symbol out of all symbols in the canceled portion of the uplink cancelation information.

In some embodiments related to the eleventh method, the third resource does not overlap in time with the second resource, and the third resource begins no earlier than a predefined point. In some examples, the predefined point is defined in the same way as in the eighth method.

Figure 19A:
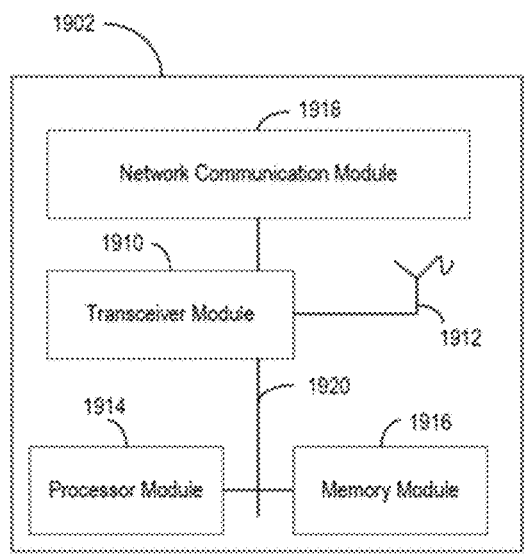
FIG. 19A illustrates a block diagram of an example base station, in accordance with some embodiments of the present disclosure.

FIG. 19A illustrates a block diagram of an example base station 1902, in accordance with some embodiments of the present disclosure. FIG. 15B illustrates a block diagram of an example UE 1901, in accordance with some embodiments of the present disclosure. Referring to FIGS. 1-15B, the UE 1901 (e.g., a wireless communication device, a terminal, a mobile device, a mobile user, and so on) is an example implementation of the UEs described herein, and the base station 1902 is an example implementation of the base station(s) described herein.

The base station 1902 and the UE 1901 can include components and elements configured to support known or conventional operating features that need not be described in detail herein. In one illustrative embodiment, the base station 1902 and the UE 1901 can be used to communicate (e.g., transmit and receive) data symbols in a wireless communication environment, as described above. For instance, the base station 1902 can be a base station (e.g., gNB, eNB, and so on), a server, a node, or any suitable computing device used to implement various network functions.

The base station 1902 includes a transceiver module 1910, an antennal 912, a processor module 1914, a memory module 1916, and a network communication module 1918. The module 1910,1912,1914,1916, and 1918 are operatively coupled to and interconnected with one another via a data communication bus 1920. The UE 1901 includes a UE transceiver module 1930, a UE antenna 1932, a UE memory module 1934, and a UE processor module 1936. The modules 1930,1932,1934, and 1936 are operatively coupled to and interconnected with one another via a data communication bus 1940. The base station 1902 communicates with the UE 1901 or another base station via a communication channel, which can be any wireless channel or other medium suitable for transmission of data as described herein.

Figure 19B:
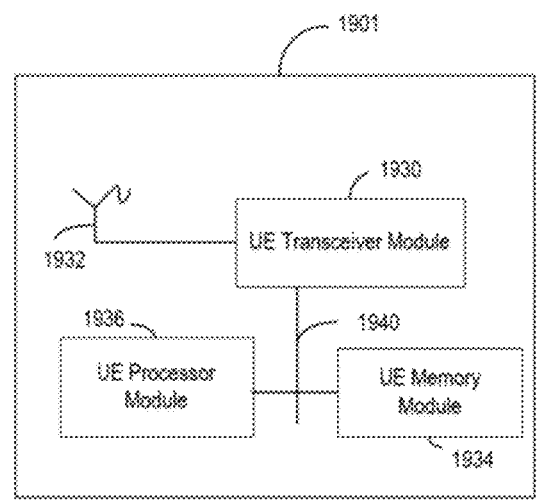
FIG. 19B illustrates a block diagram of an example UE, in accordance with some embodiments of the present disclosure.

As would be understood by persons of ordinary skill in the art, the base station 1902 and the UE 1901 can further include any number of modules other than the modules shown in FIGS. 19A and 19B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1930 includes a radio frequency (RF) transmitter and a RF receiver each including circuitry that is coupled to the antenna 1932. A duplex switch (not shown) may alternatively couple the RF transmitter or receiver to the antenna in time duplex fashion. Similarly, in accordance with some embodiments, the transceiver 1910 includes an RF transmitter and a RF receiver each having circuitry that is coupled to the antenna 1912 or the antenna of another base station. A duplex switch may alternatively couple the RF transmitter or receiver to the antenna 1912 in time duplex fashion. The operations of the two transceiver modules 1910 and 1930 can be coordinated in time such that the receiver circuitry is coupled to the antenna 1932 for reception of transmissions over a wireless transmission link at the same time that the transmitter is coupled to the antenna 1912. In some embodiments, there is close time synchronization with a minimal guard time between changes in duplex direction.

The UE transceiver 1930 and the transceiver 1910 are configured to communicate via the wireless data communication link, and cooperate with a suitably configured RF antenna arrangement 1912/1532 that can support a particular wireless communication protocol and modulation scheme. In some illustrative embodiments, the UE transceiver 1910 and the transceiver 1910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1930 and the base station transceiver 1910 may be configured to support alternate, or additional, wireless data communication protocols, including future standards or variations thereof.

The transceiver 1910 and the transceiver of another base station (such as but not limited to, the transceiver 1910) are configured to communicate via a wireless data communication link, and cooperate with a suitably configured RF antenna arrangement that can support a particular wireless communication protocol and modulation scheme. In some illustrative embodiments, the transceiver 1910 and the transceiver of another base station are configured to support industry standards such as the LTE and emerging 5G standards, and the like. It is understood, however, that the present disclosure is not necessarily limited in application to a particular standard and associated protocols. Rather, the transceiver 1910 and the transceiver of another base station may be configured to support alternate, or additional, wireless data communication protocols, including future standards or variations thereof.

In accordance with various embodiments, the base station 1902 may be a base station such as but not limited to, an eNB, a serving eNB, a target eNB, a femto station, or a pico station, for example. The base station 1902 can be an RN, a regular, a DeNB, or a gNB. In some embodiments, the UE 1901 may be embodied in various types of user devices such as a mobile phone, a smart phone, a personal digital assistant (PDA), tablet, laptop computer, wearable computing device, etc. The processor modules 1914 and 1936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1914 and 1936, respectively, or in any practical combination thereof. The memory modules 1916 and 1934 may be realized as RAM memory, flash memory, ROM memory, EPROM memory, EEPROM memory, registers, a hard disk, a removable disk, a CD-ROM, or any other form of storage medium known in the art. In this regard, memory modules 1916 and 1934 may be coupled to the processor modules 1910 and 19303, respectively, such that the processors modules 1910 and 1930 can read information from, and write information to, memory modules 1916 and 1934, respectively. The memory modules 1916 and 1934 may also be integrated into their respective processor modules 1910 and 1930. In some embodiments, the memory modules 1916 and 1934 may each include a cache memory for storing temporary variables or other intermediate information during execution of instructions to be executed by processor modules 1910 and 1930, respectively. Memory modules 1916 and 1934 may also each include non-volatile memory for storing instructions to be executed by the processor modules 1910 and 1930, respectively.

The network communication module 1918 generally represents the hardware, software, firmware, processing logic, and/or other components of the base station 1902 that enable bi-directional communication between the transceiver 1910 and other network components and communication nodes in communication with the base station 1902. For example, the network communication module 1918 may be configured to support internet or WiMAX traffic. In a deployment, without limitation, the network communication module 1918 provides an 802.3 Ethernet interface such that the transceiver 1910 can communicate with a conventional Ethernet based computer network. In this manner, the network communication module 1918 may include a physical interface for connection to the computer network (e.g., Mobile Switching Center (MSC)). In some embodiments, the network communication module 1918 includes a fiber transport connection configured to connect the base station 1902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method, comprising:
   determining, by a wireless communication device, that a first resource indicated by uplink cancelation information overlaps with a second resource; and
   receiving, by the wireless communication device from a network, an uplink (UL) grant scheduling a third resource, wherein an ending symbol of a first downlink control channel carrying the UL grant is no earlier than a first symbol of a second downlink control channel carrying the uplink cancelation information,
   wherein the third resource does not overlap in time with the second resource, and
   wherein the third resource begins no earlier than a predefined point.

2. The method of claim 1, wherein
   the uplink cancelation information comprises an Uplink Cancelation Indication (UL CI); and
   the first resource, the second resource, and the third resource are uplink resources.

3. The method of claim 1, wherein
   the second resource is scheduled by the network via another UL grant; and
   an ending symbol of the another UL grant is earlier than a first symbol of the second downlink control channel carrying the uplink cancelation information.

4. The method of claim 1, wherein a time interval between an end of the second downlink control channel carrying the uplink cancelation information and a start of the first downlink control channel carrying the UL grant is no less than a predetermined threshold.

5. The method of claim 1, wherein the UL grant is carried on the first downlink control channel having an ending symbol that is no earlier than a first symbol of a third downlink control channel carrying a subsequent uplink cancelation information, the subsequent uplink cancelation information is received after the uplink cancelation information is received.

6. The method of claim 1, wherein
   the third resource starts later than an ending symbol of the second resource.

7. The method of claim 1, wherein the predefined point is a number of symbols after an end of the uplink cancelation information.

8. The method of claim 1, wherein the predefined point is a number of symbols after a start of a canceled portion of the second resource.

9. The method of claim 1, wherein the predefined point is a number of symbols after an end of the second resource.

10. A method, comprising:
transmitting, by a network to a wireless communication device, uplink cancelation information indicating a first resource, wherein the first resource overlaps with a second resource of the wireless communication device; and
transmitting, by the network to the wireless communication device, an uplink (UL) grant scheduling a third resource, wherein an ending symbol of a first downlink control channel carrying the UL grant is no earlier than a first symbol of a second downlink control channel carrying the uplink cancelation information,
wherein the third resource does not overlap in time with the second resource, and
wherein the third resource begins no earlier than a predefined point.

11. The method of claim 10, wherein
the uplink cancelation information comprises an Uplink Cancelation Indication (UL CI); and
the first resource, the second resource, and the third resource are uplink resources of the wireless communication device.

12. The method of claim 10, wherein
the second resource is scheduled by the network via another UL grant; and
an ending symbol of the another UL grant is earlier than a first symbol of the second downlink control channel carrying the uplink cancelation information.

13. The method of claim 10, wherein a time interval between an end of the second downlink control channel carrying the uplink cancelation information and a start of the first downlink control channel carrying the UL grant is no less than a predetermined threshold.

14. The method of claim 10, wherein the UL grant is carried on the first downlink control channel having an ending symbol that is no earlier than a first symbol of a third downlink control channel carrying a subsequent uplink cancelation information, the subsequent uplink cancelation information is transmitted after the uplink cancelation information is transmitted.

15. A wireless communication device, comprising:
at least one processor configured to:
determine that a first resource indicated by uplink cancelation information overlaps with a second resource; and
receive, via a receiver from a network, an uplink (UL) grant scheduling a third resource, wherein an ending symbol of a first downlink control channel carrying the UL grant is no earlier than a first symbol of a second downlink control channel carrying the uplink cancelation information,
wherein the third resource does not overlap in time with the second resource, and
wherein the third resource begins no earlier than a predefined point.

16. The wireless communication device of claim 15, wherein the predefined point is a number of symbols after an end of the uplink cancelation information.

17. The wireless communication device of claim 15, wherein the predefined point is a number of symbols after a start of a canceled portion of the second resource.

18. The wireless communication device of claim 15, wherein the predefined point is a number of symbols after an end of the second resource.

19. A network node, comprising:
at least one processor configured to:
transmit, via a transmitter to a wireless communication device, uplink cancelation information indicating a first resource, wherein the first resource overlaps with a second resource of the wireless communication device; and
transmit, via the transmitter to the wireless communication device, an uplink (UL) grant scheduling a third resource, wherein an ending symbol of a first downlink control channel carrying the UL grant is no earlier than a first symbol of a second downlink control channel carrying the uplink cancelation information,
wherein the third resource does not overlap in time with the second resource, and
wherein the third resource begins no earlier than a predefined point.

20. The network node of claim 19, wherein
the uplink cancelation information comprises an Uplink Cancelation Indication (UL CI); and
the first resource, the second resource, and the third resource are uplink resources of the wireless communication device.

* * * * *